(12) United States Patent
Kumar et al.

(10) Patent No.: US 11,956,808 B2
(45) Date of Patent: Apr. 9, 2024

(54) SCHEDULING REQUEST (SR) MANAGEMENT FOR SPLIT DATA RADIO BEARER (DRB) IN A WIRELESS WIDE AREA NETWORK (WWAN)

(71) Applicant: QUALCOMM incorporated, San Diego, CA (US)

(72) Inventors: Akshay Kumar, San Diego, CA (US); Arnaud Meylan, San Diego, CA (US); Leena Zacharias, San Jose, CA (US); Michel Chauvin, San Diego, CA (US); Vishal Dalmiya, San Diego, CA (US); Ambarish Tripathi, San Diego, CA (US); Shailesh Maheshwari, San Diego, CA (US); Sathyanarayanan Raghunathan, San Diego, CA (US); Baojun Lu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 129 days.

(21) Appl. No.: 17/482,785

(22) Filed: Sep. 23, 2021

(65) Prior Publication Data

US 2022/0095325 A1    Mar. 24, 2022

Related U.S. Application Data

(60) Provisional application No. 63/082,924, filed on Sep. 24, 2020.

(51) Int. Cl.
*H04W 72/12* (2023.01)
*H04W 72/52* (2023.01)

(52) U.S. Cl.
CPC .................................. *H04W 72/52* (2023.01)

(58) Field of Classification Search
CPC . H04W 76/18; H04W 76/30; H04W 72/1252; H04W 72/1278; H04W 72/1236; H04W 72/1284; H04W 72/14; H04W 72/1242
See application file for complete search history.

(56) References Cited

U.S. PATENT DOCUMENTS

| 2010/0077100 A1* | 3/2010 | Hsu | H04W 72/04 709/234 |
| 2010/0202420 A1* | 8/2010 | Jersenius | H04W 72/56 370/337 |
| 2015/0382372 A1* | 12/2015 | Vajapeyam | H04W 72/1263 370/329 |
| 2019/0098606 A1* | 3/2019 | Sharma | H04W 76/15 |

\* cited by examiner

*Primary Examiner* — Rasheed Gidado
(74) *Attorney, Agent, or Firm* — Holland & Hart LLP

(57) ABSTRACT

This disclosure provides systems, methods, and apparatus, including computer programs encoded on computer-readable media, for managing scheduling requests (SRs) in a user equipment (UE) that supports a split data radio bearer (DRB). In some aspects, the UE may trigger a first SR for a first communication link and a second SR for a second communication link in response to determining that a first amount of data in the UE data buffer is greater than a first threshold. The UE may transmit the first SR to a first base station (BS) via the first communication link. Prior to transmission of the second SR, the UE may determine whether a second amount of data in the UE data buffer is less than a second threshold. The UE may cancel the second SR in response to the second amount of data in the UE data buffer being less than the second threshold.

23 Claims, 10 Drawing Sheets

SCHEDULING REQUEST (SR) MANAGEMENT FOR SPLIT DATA RADIO BEARER (DRB) IN A WIRELESS WIDE AREA NETWORK (WWAN)

CROSS-REFERENCE TO RELATED APPLICATIONS

This Patent Application claims priority to U.S. Provisional Patent Application No. 63/082,924, filed Sep. 24, 2020, entitled "SCHEDULING REQUEST (SR) MANAGEMENT FOR SPLIT DATA RADIO BEARER (DRB) IN A WIRELESS WIDE AREA NETWORK (WWAN)," and assigned to the assignee hereof. The disclosure of the prior Application is considered part of and is incorporated by reference in this Patent Application.

TECHNICAL FIELD

Aspects of the present disclosure relate generally to wireless communication and to techniques for managing scheduling requests (SRs) in a user equipment (UE) for a split data radio bearer (DRB).

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (such as time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the $3^{rd}$ generation (3G) and $4^{th}$ generation (4G, including long term evolution (LTE)) technologies to a next generation new radio (NR) technology, which may be referred to as $5^{th}$ Generation (5G) or 5G NR. For example, NR is designed to provide a lower latency, a higher bandwidth or a higher throughput, and a higher reliability than 3G or LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave (mmW)) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

Wireless communication networks may support some combination of 2G, 3G, LTE, and 5G NR technologies. A UE may communicate with the wireless communication network using one or more of the 2G, 3G, LTE, and 5G NR technologies. For example, the UE may use 5G NR for some applications, such as data transmissions, and may use LTE for other applications, such as voice transmissions. A UE also may have access to wireless local area networks (WLANs) in the wireless communication network.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method for wireless communication performed by an apparatus of a user equipment (UE). The method may include determining a first amount of data in a UE data buffer, triggering a scheduling request (SR) for a communication link in response to determining the first amount of data in the UE data buffer, and prior to outputting the SR for transmission to a base station (BS) via the communication link, determining whether a second amount of data in the UE data buffer is less than a threshold.

In some implementations, the method may include, in response to the second amount of data in the UE data buffer being less than the threshold, canceling the SR at the UE prior to outputting the SR for transmission to the BS via the communication link.

In some implementations, the method of canceling the SR at the UE prior to outputting the SR for transmission to the BS may include canceling the SR at the UE a threshold time period before the SR is scheduled for transmission to the BS.

In some implementations, the method of determining whether the second amount of data in the UE data buffer is less than the threshold may include one of determining whether the second amount of data in the UE data buffer is less than a threshold byte of data, or determining whether the second amount of data in the UE data buffer is equal to zero bytes of data.

In some implementations, the method may include determining that the communication link does not have scheduled data retransmissions, control messages, or status feedback messages, and canceling the SR at the UE prior to outputting the SR for transmission to the BS in response to determining that the second amount of data in the UE data buffer is less than the threshold, and determining that the communication link does not have scheduled data retransmissions, control messages, or status feedback messages.

In some implementations, the communication link may be a 5G New Radio (NR) communication link or a Long-Term Evolution (LTE) communication link.

Another innovative aspect of the subject matter described in this disclosure can be implemented in a method for wireless communication performed by an apparatus of a UE that supports a split data radio bearer (DRB). The method may include determining that a first amount of data in a UE data buffer is greater than a first threshold, triggering a first SR for a first communication link and a second SR for a second communication link in response to determining that the first amount of data in the UE data buffer is greater than the first threshold, outputting the first SR for transmission to a first BS via the first communication link, and prior to outputting the second SR for transmission via the second communication link, determining whether a second amount of data in the UE data buffer is less than a second threshold.

In some implementations, the method may include, in response to the second amount of data in the UE data buffer being less than the second threshold, canceling the second SR at the UE prior to outputting the second SR for transmission to a second BS via the second communication link.

In some implementations, the method of canceling the second SR at the UE prior to outputting the second SR for transmission to the second BS may include canceling the second SR at the UE a threshold time period before the second SR is scheduled for transmission to the second BS.

In some implementations, the method of determining that the first amount of data in the UE data buffer is greater than the first threshold may include determining that the first amount of data in the UE data buffer is greater than a split data threshold.

In some implementations, the method of determining whether the second amount of data in the UE data buffer is less than the second threshold may include one of determining whether the second amount of data in the UE data buffer is less than a split data threshold, determining whether the second amount of data in the UE data buffer is less than a threshold byte of data, or determining whether the second amount of data in the UE data buffer is equal to zero bytes of data.

In some implementations, the first communication link may be a primary communication link and the second communication link may be a secondary communication link. The method may include determining, after the second SR is triggered for the secondary communication link, that the second amount of data in the UE data buffer is less than the second threshold, and canceling the second SR at the UE prior to outputting the second SR for transmission to a second BS via the secondary communication link in response to the second amount of data in the UE data buffer being less than the second threshold.

In some implementations, the method may include determining that the secondary communication link does not have scheduled data retransmissions, control messages, or status feedback messages, and canceling the second SR at the UE prior to outputting the second SR for transmission to the second BS in response to determining that the second amount of data in the UE data buffer is less than the second threshold, and determining that the secondary communication link does not have scheduled data retransmissions, control messages, or status feedback messages.

In some implementations, the primary communication link may be a 5G NR communication link and the secondary communication link may be an LTE communication link, the primary communication link may be an LTE communication link and the secondary communication link may be a 5G NR communication link, or the primary communication link may be a first 5G NR communication link and the secondary communication link may be a second 5G NR communication link.

In some implementations, the method of canceling the second SR may include canceling a first transmission of the second SR or canceling a retransmission of the second SR.

In some implementations, the first communication link may be a secondary communication link and the second communication link may be a primary communication link. The method may include determining, after the second SR is triggered for the primary communication link, that the second amount of data in the UE data buffer is less than the second threshold, and canceling the second SR at the UE prior to transmission of the second SR to a second BS via the primary communication link in response to determining that the second amount of data in the UE data buffer is less than the second threshold.

In some implementations, the method may include determining that the primary communication link does not have scheduled data retransmissions, control messages, or status feedback messages, and canceling the second SR at the UE prior to transmission of the second SR to the second BS in response to determining that the second amount of data in the UE data buffer is less than the second threshold, and determining that the primary communication link does not have scheduled data retransmissions, control messages, or status feedback messages.

In some implementations, the method may include determining, after the second SR is triggered, the second amount of data in the UE data buffer. The method of determining the second amount of data in the UE data buffer may include determining an amount of data in the UE data buffer for the split DRB and across all other DRBs associated with a corresponding radio access technology (RAT).

In some implementations, the split DRB may be associated with a first SR configuration, and the method of determining the second amount of data in the UE data buffer may include determining an amount of data in the UE data buffer for the split DRB and across all other DRBs associated with the corresponding RAT and associated with the first SR configuration.

In some implementations, the first SR may be scheduled for transmission in a first Physical Uplink Control Channel (PUCCH) from the UE to the first BS and the second SR may be scheduled for transmission in a second PUCCH from the UE to a second BS.

In some implementations, the method may include obtaining one or more grants from the first BS in response to the first SR, and outputting one or more data packet for transmission to the first BS via the first communication link in response to obtaining the one or more grants, the one or more data packet including at least a portion of the first amount of data in the UE data buffer.

Another innovative aspect of the subject matter described in this disclosure can be implemented in an apparatus of a UE for wireless communication. The apparatus may include one or more interfaces and one or more processors. The one or more processors may be configured to determine a first amount of data in a UE data buffer, trigger an SR for a communication link in response to determining the first amount of data in the UE data buffer, and prior to transmission of the SR to a BS via the communication link, determine whether a second amount of data in the UE data buffer is less than a threshold.

In some implementations, the one or more processors may be further configured to cancel the SR at the UE prior to transmission of the SR to the BS via the communication link in response to the second amount of data in the UE data buffer being less than the threshold.

In some implementations, the one or more processors may be further configured to cancel the SR at the UE a threshold time period before the SR is scheduled for transmission to the BS.

In some implementations, the one or more processors being configured to determine whether the second amount of data in the UE data buffer is less than a threshold may include one of the one or more processors configured to determine whether the second amount of data in the UE data buffer is less than a threshold byte of data, or the one or more processors being configured to determine whether the second amount of data in the UE data buffer is equal to zero bytes of data.

In some implementations, the one or more processors are further configured to determine that the communication link does not have scheduled data retransmissions, control messages, or status feedback messages, and cancel the SR at the UE prior to outputting the SR for transmission to the BS in response to a determination that the second amount of data in the UE data buffer is less than the threshold, and a determination that the communication link does not have scheduled data retransmissions, control messages, or status feedback messages.

Another innovative aspect of the subject matter described in this disclosure can be implemented in an apparatus of a UE for wireless communication. The apparatus may include one or more interfaces and one or more processors. The one or more processors may be configured to determine that a first amount of data in a UE data buffer is greater than a first threshold, and trigger a first SR for a first communication link and a second SR for a second communication link in response to a determination that the first amount of data in the UE data buffer is greater than the first threshold. The one or more interfaces may be configured to output the first SR for transmission to a first BS via the first communication link. The one or more processors may be configured to, prior to transmission of the second SR via the second communication link, determine whether a second amount of data in the UE data buffer is less than a second threshold.

In some implementations, the one or more processors may be further configured to cancel the second SR at the UE prior to transmission of the second SR to a second BS via the second communication link in response to the second amount of data in the UE data buffer being less than the second threshold.

In some implementations, the one or more processors may be further configured to cancel the second SR at the UE a threshold time period before the second SR is scheduled for transmission to the second BS.

In some implementations, the one or more processors configured to determine that the first amount of data in the UE data buffer is greater than the first threshold may include the one or more processors configured to determine that the first amount of data in the UE data buffer is greater than a split data threshold.

In some implementations, the one or more processors configured to determine whether the second amount of data in the UE data buffer is less than the second threshold may include one of the one or more processors configured to determine whether the second amount of data in the UE data buffer is less than a split data threshold, the one or more processors configured to determine whether the second amount of data in the UE data buffer is less than a threshold byte of data, or the one or more processors configured to determine whether the second amount of data in the UE data buffer is equal to zero bytes of data.

In some implementations, the first communication link may be a primary communication link and the second communication link may be a secondary communication link. The one or more processors may be further configured to determine, after the second SR is triggered for the secondary communication link, that the second amount of data in the UE data buffer is less than the second threshold, and cancel the second SR at the UE prior to transmission of the second SR to a second BS via the secondary communication link in response to the second amount of data in the UE data buffer being less than the second threshold.

In some implementations, the one or more processors may be further configured to determine that the secondary communication link does not have scheduled data retransmissions, control messages, or status feedback messages, and cancel the second SR at the UE prior to transmission of the second SR to the second BS in response to a determination that the second amount of data in the UE data buffer is less than the second threshold, and a determination that the secondary communication link does not have scheduled data retransmissions, control messages, or status feedback messages.

In some implementations, the one or more processors configured to cancel the second SR may include the one or more processors configured to cancel a first transmission of the second SR or canceling a retransmission of the second SR.

In some implementations, the first communication link may be a secondary communication link and the second communication link may be a primary communication link. The one or more processors may be further configured to determine, after the second SR is triggered for the primary communication link, that the second amount of data in the UE data buffer is less than the second threshold, and cancel the second SR at the UE prior to transmission of the second SR to a second BS via the primary communication link in response to determining that the second amount of data in the UE data buffer is less than the second threshold.

In some implementations, the one or more processors may be further configured to determine that the primary communication link does not have scheduled data retransmissions, control messages, or status feedback messages, and cancel the second SR at the UE prior to transmission of the second SR to the second BS in response to a determination that the second amount of data in the UE data buffer is less than the second threshold, and a determination that the primary communication link does not have scheduled data retransmissions, control messages, or status feedback messages.

In some implementations, the one or more processors may be further configured to determine, after the second SR is triggered, the second amount of data in the UE data buffer. The determination of the second amount of data in the UE data buffer may include a determination an amount of data in the UE data buffer for the split DRB and across all other DRBs associated with a corresponding RAT.

In some implementations, the one or more processors may be further configured to obtain one or more grants from the first BS in response to the first SR, and output one or more data packet for transmission to the first BS via the first communication link in response to obtainment of the one or more grants, the one or more data packet including at least a portion of the first amount of data in the UE data buffer.

Another innovative aspect of the subject matter described in this disclosure can be implemented in a non-transitory computer-readable medium having stored therein instructions which, when executed by a processor of a UE, cause the UE to determine that a first amount of data in a UE data buffer is greater than a first threshold, trigger a first SR for a first communication link and a second SR for a second communication link in response to a determination that the first amount of data in the UE data buffer is greater than the first threshold, output the first SR for transmission to a first BS via the first communication link, and prior to transmission of the second SR via the second communication link, determine whether a second amount of data in the UE data buffer is less than a second threshold.

Another innovative aspect of the subject matter described in this disclosure can be implemented in an apparatus of a UE for wireless communication. The apparatus may include means for determining that a first amount of data in a UE data buffer is greater than a first threshold, means for triggering a first SR for a first communication link and a second SR for a second communication link in response to a determination that the first amount of data in the UE data buffer is greater than the first threshold, means for outputting the first SR for transmission to a first BS via the first communication link, and means for determining, prior to transmission of the second SR via the second communication link, whether a second amount of data in the UE data buffer is less than a second threshold.

Aspects of the subject matter described in this disclosure can be implemented in a device, a software program, a system, or other means to perform any of the above-mentioned methods.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
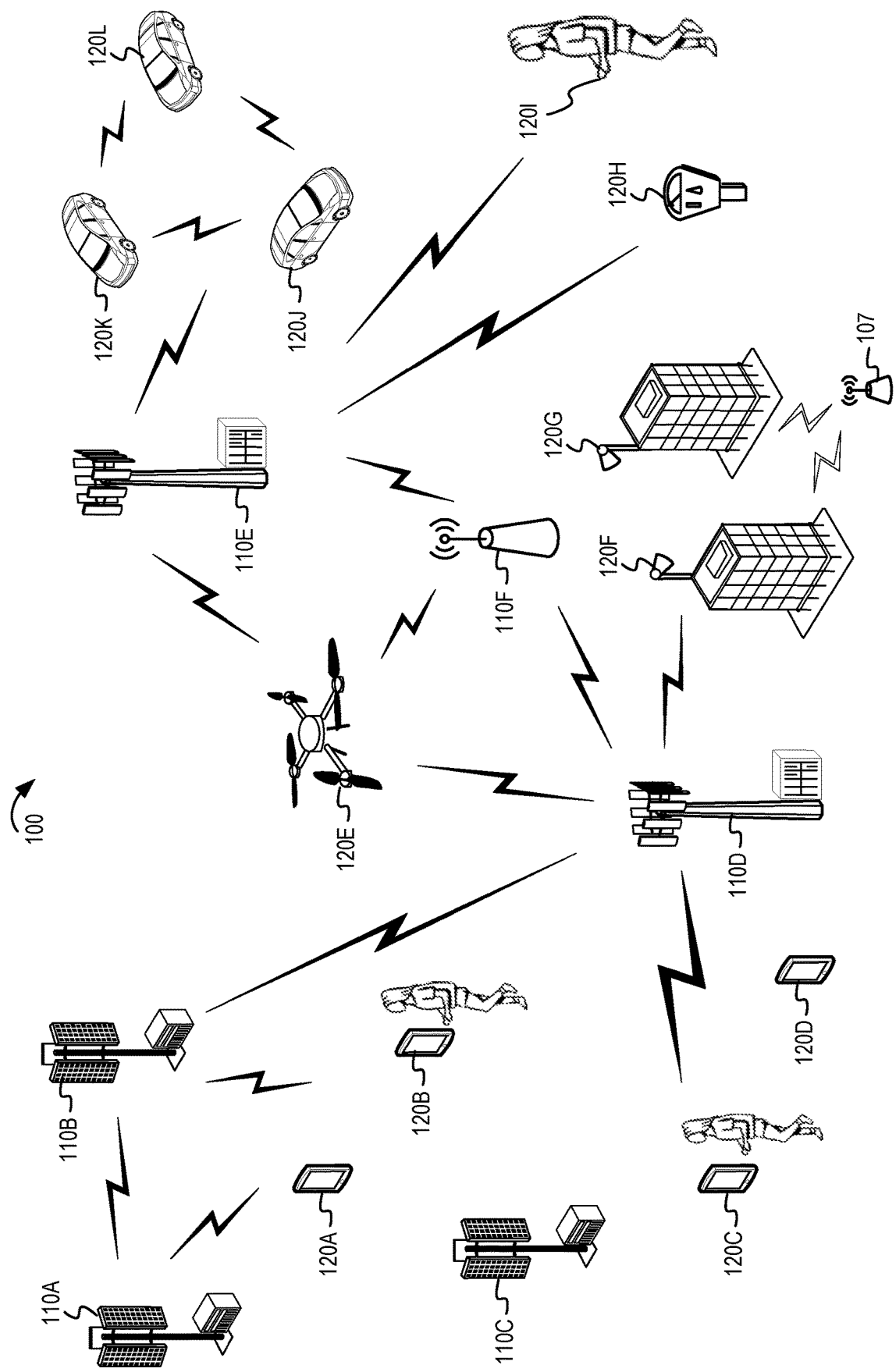
FIG. 1 is a system diagram of an example wireless communication network.

The following description is directed to certain implementations for the purposes of describing the innovative aspects of this disclosure. However, a person having ordinary skill in the art will readily recognize that the teachings herein can be applied in a multitude of different ways. The examples in this disclosure are based on wireless network communications in wide area networks (WANs). However, the described implementations may be implemented in any device, system or network that is capable of transmitting and receiving radio frequency signals according to any of the Institute of Electrical and Electronics Engineers (IEEE) 802.11 standards, the Bluetooth® standard, code division multiple access (CDMA), time division multiple access (TDMA), frequency division multiple access (FDMA), orthogonal FDMA (OFDMA), single-carrier FDMA (SC-FDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), $5^{th}$ Generation (5G) or new radio (NR), Advanced Mobile Phone Service (AMPS), or other known signals that are used to communicate within a wireless, cellular or internet of things (IoT) network, such as a system utilizing 3G, 4G or 5G, or further implementations thereof, technology.

A wireless communication network (which also may be referred to as a wireless WAN or WWAN) may include base stations (BSs) that implement a 5G NR radio access technology (RAT) of a 5G NR network and BSs that implement an LTE RAT of an LTE network. The RATs of a WWAN also may be referred to as WWAN RATs. A wireless communication network also may include BSs having a Multi-Radio Dual Connectivity (MR-DC) architecture. The MR-DC architecture may be an Evolved Universal Terrestrial Radio Access (E-UTRA) NR DC (EN-DC) architecture or an NR-DC architecture. The EN-DC architecture may include a first BS that implements the 5G NR RAT and a second BS that implements the LTE RAT. In the NR-DC architecture, both the first and second BSs implement the 5G NR RAT. A user equipment (UE) of the wireless communication network may use the 5G NR RAT, the LTE RAT, or both the 5G NR RAT and LTE NR RAT via the MR-DC architecture depending on which wireless coverage is available to the UE and which wireless coverage provides the best quality service.

The UE may operate in an MR-DC mode (such as an EN-DC mode or an NR-DC mode) when the UE is connected to BSs having an MR-DC architecture. When the UE operates in an MR-DC mode, the UE may determine whether to establish a split data radio bearer (DRB) based on the amount of data in a data buffer (such as an uplink (UL) data buffer). For example, the UE may determine to establish a split DRB when the amount of data in the data buffer is greater than a split data threshold. The split data threshold also may be referred to as a first threshold, an UL split data threshold, or ul-DataSplitThreshold. The split DRB may use both a primary communication link to a first BS and a secondary communication link to a second BS to transmit the data in the data buffer. In the EN-DC architecture, the primary communication link may be connected to either the 5G NR BS or the LTE BS, and the secondary communication link may be connected to the other BS. In the NR-DC architecture, both the primary and secondary communication links are connected to a 5GNR BS.

After the split DRB is established, the UE may trigger a scheduling request (SR) on both the primary communication link and the secondary communication link. For example, a first SR may be triggered for the primary communication link and a second SR may be triggered for the secondary communication link. Even if the first and second SRs for both links are triggered at approximately the same time, the transmission opportunities for both links and other associated processing of the SRs may not be synchronized. For example, a first Physical Uplink Control Channel (PUCCH) that may be used to transmit the first SR to the first BS may not be synchronized with a second PUCCH that may be used to transmit the second SR to the second BS. Also, the network processing delays of SRs for the different RATs may be uncorrelated and therefore may not be synchronized.

Based on the lack of synchronization, the first SR may be transmitted to the first BS, one or more grants may be received from the first BS, and one or more data packets may be transmitted to the first BS using the one or more grants prior to the UE transmitting the second SR to the second BS. Therefore, a large portion (or all) of the data in the data buffer may be drained prior to the UE transmitting the second SR to the second BS. For example, if the data buffer includes data from bursty UL traffic, the data that is transmitted in the one or more packets to the first BS may drain most or all of the data in the data buffer and the data buffer may not receive additional data until the next data burst. However, since the second SR was triggered when the data in the data buffer was greater than the split data threshold, the UE typically transmits the second SR to the second BS in order to receive one or more grants from the second BS without checking the latest amount of data in the data buffer. The latest amount of data in the data buffer may be less than the split data threshold or the data buffer may be empty. Thus, the UE may receive one or more grants from the second BS that may not be needed and may waste UL resources and UE power. For example, since the UE typically has to respond to each of the received grants, the UE may respond with a packet with padded bytes, which wastes UL resources and UE power.

Furthermore, the first and second BSs typically overestimate the amount of data that is available in the data buffer because there is typically no coordination between the BSs about grants. For example, the second BS may not know how many grants the first BS has provided to the UE since the BSs typically do not exchange information about the grants that have been served on each link. Also, the error in the BS's estimate of the amount of data in the data buffer also may be caused by the throughput differences between the links and how infrequent the UE may provide buffer status reports (BSRs) in the links. For example, if the throughput in the primary communication link is greater than the throughput in the secondary communication link and the BSR reporting period for the primary communication link is much shorter than the BSR reporting period of the secondary communication link, the first BS may have an accurate estimate of the amount of data in the data buffer and thus may have a low chance of wasting grants via the primary communication link. However, the second BS may not have an accurate estimate of the amount of data in the data buffer (may overestimate the amount of data) and thus may have a high chance of wasting grants via the secondary communication link. Similar inefficiencies may be faced when grants received via the secondary communication link based on the first SR drain the data in the data buffer prior to the UE sending the second SR via the primary communication link. For example, if the throughput in the secondary communication link is greater than the throughput in the primary communication link and the BSR reporting period for the secondary communication link is much shorter than the BSR reporting period of the primary communication link, the second BS may have an accurate estimate of the amount of data in the data buffer and thus may have a low chance of wasting grants via the secondary communication link. However, the first BS may not have an accurate estimate of the amount of data in the data buffer (may overestimate the amount of data) and thus may have a high chance of wasting grants via the primary communication link. The unnecessary grants provided by either BS to the UE may result in wasted UL resources and wasted UE power.

In some implementations, when an SR is triggered for both the primary communication link and the second communication link, the UE may transmit the first SR via either the primary communication link or the secondary communication link. In some implementations, if the UE transmits the first SR via the primary communication link, the UE 120 may determine whether to transmit or cancel the transmission of the second SR via the secondary communication link based on a second amount of data in the data buffer. For example, after the second SR is triggered and prior to transmission of the second SR via the secondary communication link, the UE may determine whether or not to cancel the transmission of the second SR based on whether the second amount of data in the data buffer is less than a second threshold (such as the split data threshold). After the UE transmits one or more data packets via the primary communication link based on one or more received grants, the amount of data in the data buffer may change to a second amount of data. Additional data also may be received in the data buffer. In some implementations, the second amount of data may be the sum of the data associated with the split DRB and the data of any other RAT-specific bearers of the UE that are associated with the same SR configuration as the split DRB. The second amount of data also may be zero if the one or more data packets that were transmitted via the primary communication link drained all of the data from the data buffer associated with the split DRB and there is no additional data for any other RAT-specific bearers of the UE with the same SR configuration as the split DRB.

In some implementations, if the second amount of data in the data buffer is less than the second threshold, the UE may cancel the second SR prior to transmission of the second SR via the secondary communication link. In some implementations, in addition to determining whether the second amount of data is less than the second threshold, the UE may determine whether the secondary communication link has any data retransmissions, control messages, or status feedback messages scheduled for transmission via the secondary communication link. If the second amount of data in the data buffer is less than the second threshold and the UE does not have data retransmissions, control messages, or status feedback messages scheduled for transmission via the secondary communication link, the UE may cancel the second SR prior to transmission of the second SR via the secondary communication link, as further described herein.

In some implementations, if the UE transmits the first SR via the secondary communication link, the UE may determine whether to transmit or cancel the transmission of the second SR via the primary communication link based on whether a second amount of data in the data buffer is less than a third threshold. For example, after the second SR is triggered and prior to transmission of the second SR via the primary communication link, the UE may determine to cancel the transmission of the second SR based on whether the second amount of data in the data buffer is less than the split data threshold, based on whether the second amount of data in the data buffer is less than a threshold byte of data, or based on whether the data buffer is empty. The second amount of data may be the sum of the data associated with the split DRB and the data of any other RAT-specific bearers of the UE that are associated with the same SR configuration as the split DRB. The second amount of data also may be zero if the one or more data packets that were transmitted via the secondary communication link drained all of the data from the data buffer associated with the split DRB and there is no additional data for any other RAT-specific bearers of the UE with the same SR configuration as the split DRB. As described herein, in some implementations, the UE also may determine whether the primary communication link has any data retransmissions, control messages, or status feedback messages scheduled for transmission via the secondary communication link in order to determine whether to cancel the second SR prior to transmission of the second SR via the primary communication link, as further described herein.

In some implementations, the UE also may determine whether to cancel an SR when the DRB is not a split DRB. For example, the DRB may be an LTE DRB that uses an LTE communication link or a 5G NR DRB that uses a 5G NR communication link. In some implementations, the UE may determine that the data buffer has a first amount of data. The UE may determine to trigger an SR in a communication link associated with the DRB after determining that the data buffer has the first amount of data. After the SR is triggered and prior to transmission of the SR, the data in the data buffer may be discarded. For example, the data in the data buffer may be discarded due to a Packet Data Convergence Protocol (PDCP) discard timer or due to another internal process. In some implementations, after the SR is triggered and prior to transmission of the SR, the UE may determine whether to perform or cancel the transmission of the SR based on a second amount of data in the data buffer. In some implementations, when the second amount of data in the data buffer is less than a threshold, the UE may cancel the SR prior to transmission of the SR via the communication link. For example, if the data in the data buffer is discarded after the SR is triggered and prior to transmission of the SR, the UE may cancel the SR if the data buffer is empty, as further described herein.

Particular implementations of the subject matter described in this disclosure can be implemented to realize one or more of the following potential advantages. After the UE receives grants based on a first SR, the UE may optimize the management of SRs by checking the amount of data in the data buffer prior to transmission of a second SR. The UE may cancel the second SR if the UE determines that the amount of data in the data buffer is less than the split data threshold or the data buffer is empty. Canceling the second SR prior to transmission of the second SR may prevent the UE receiving unnecessary grants from the corresponding BS based on the second SR. The UE canceling unnecessary SRs prior to transmission of the SRs may reduce wasted UL resources and wasted UE power. When an SR is canceled prior to transmission, the UE may save the power that is used in an awake state waiting to transmit the SR, may save the power that is used to transmit the SR, may save the power that is used to transmit the data based on the grants received in response to the SR, and may save the power that is used in an awake state started by the received grants. Thus, canceling unnecessary SRs prior to transmission of the SRs may significantly improve power consumption with very minimal (or no) throughput reduction in the presence of bursty traffic. Also, canceling unnecessary SRs may reduce unnecessary network traffic and thus may improve overall network performance.

FIG. 1 is a system diagram of an example wireless communication network 100. The wireless communication network 100 may be an LTE network or a 5G NR network, or a combination thereof. The wireless communication network 100 also may be referred to as a wide area network (WAN) or a wireless wide area network (WWAN). The wireless communication network 100 includes a number of base stations (BSs) 110 (individually labeled as 110A, 110B, 110C, 110D, 110E, and 110F) and other network entities. A BS 110 may be a station that communicates with UEs 120 and also may be referred to as an evolved node B (eNB), a next generation eNB (gNB), an access point, and the like. In some implementations, a BS 110 may represent an eNB of an LTE network or a gNB of a 5G NR network, or a combination thereof. Each BS 110 may provide communication coverage for a particular geographic area. In 3GPP, the term "cell" can refer to this particular geographic coverage area of a BS 110 or a BS subsystem serving the coverage area, depending on the context in which the term is used.

ABS 110 may provide communication coverage for a macro cell or a small cell, such as a pico cell or a femto cell, or other types of cells. A macro cell generally covers a relatively large geographic area (such as several kilometers in radius) and may allow unrestricted access by UEs with service subscriptions with the network provider. A pico cell generally covers a relatively smaller geographic area and may allow unrestricted access by UEs with service subscriptions with the network provider. A femto cell generally covers a relatively small geographic area (such as a home) and, in addition to unrestricted access, also may provide restricted access by UEs having an association with the femto cell (such as UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 110D and 110E may be regular macro BSs, while the BSs 110A-110C may be macro BSs enabled with three dimensions (3D), full dimensions (FD), or massive MIMO. The BSs 110A-110C may take advantage of their higher dimension MIMO capabilities to exploit 3D beamforming in both elevation and azimuth beamforming to increase coverage and capacity. The BS 110F may be a small cell BS which may be a home node or portable access point. A BS 110 may support one or multiple (such as two, three, four, and the like) cells.

The wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 120 are dispersed throughout the wireless communication network 100, and each UE 120 may be stationary or mobile. A UE 120 also may be referred to as a terminal, a mobile station, a wireless device, a subscriber unit, a station, or the like. A UE 120 may be a mobile phone, a personal digital assistant (PDA), a wireless modem, a wireless communication device, a handheld device, a wearable device, a tablet computer, a laptop computer, a cordless phone, a wireless local loop (WLL) station, a smart appliance, a drone, a video camera, a sensor, or the like. In one aspect, a UE 120 may be a device that includes a Universal Integrated Circuit Card (UICC). In another aspect, a UE may be a device that does not include a UICC. In some aspects, the UEs 120 that do not include UICCs also may be referred to as IoT devices or internet of everything (IoE) devices. The UEs 120A-120D are examples of mobile smart phone-type devices that may access the wireless communication network 100. A UE 120 also may be a machine specifically configured for connected communication, including machine type communication (MTC), enhanced MTC (eMTC), narrowband IoT (NB-IoT), and the like. The UEs 120E-120L are examples of various machines configured for communication that access the wireless communication network 100. A UE 120 may be able to communicate with any type of the BSs, whether macro BS, small cell, or the like. In FIG. 1, a lightning bolt is representative of a communication link that indicates wireless transmissions between a UE 120 and a serving BS 110, which is a BS designated to serve the UE 120 on the downlink and uplink, or desired transmission between BSs, and backhaul transmissions between BSs.

In operation, the BSs 110A-110C may serve the UEs 120A and 120B using 3D beamforming and coordinated spatial techniques, such as coordinated multipoint (CoMP) or multi-connectivity. The macro BS 110D may perform backhaul communications with the BSs 110A-110C, as well as the BS 110F (which may be a small cell BS). The macro BS 110D also may transmit multicast services which are subscribed to and received by the UEs 120C and 120D. Such multicast services may include mobile television or stream video, or may include other services for providing community information, such as weather emergencies or alerts, such as Amber alerts or gray alerts.

The BSs 110 also may communicate with a core network. The core network may provide user authentication, access authorization, tracking, Internet Protocol (IP) connectivity, and other access, routing, or mobility functions. At least some of the BSs 110 (such as a gNB or an access node controller (ANC)) may interface with the core network through backhaul links (such as NG-C and NG-U) and may perform radio configuration and scheduling for communication with the UEs 120. In various examples, the BSs 110 may communicate, either directly or indirectly (such as through core network), with each other over backhaul links, which may be wired or wireless communication links.

The wireless communication network 100 also may support mission critical communications with ultra-reliable and redundant links for mission critical devices, such as the UE 120E, which may be a drone. Redundant communication links with the UE 120E may include links from the macro BSs 110D and 110E, as well as links from the small cell BS 110F. Other machine type devices, such as the UE 120F and UE 120G (such as video cameras or smart lighting), the UE 120H (such as a smart meter), and UE 120I (such as a wearable device) may communicate through the wireless communication network 100 either directly with the BSs, such as the small cell BS 110F, and the macro BS 110E, or in multi-hop configurations by communicating with another user device which relays its information to the wireless communication network 100. For example, the UE 120H may communicate smart meter information to the UE 120I (such as a wearable device or mobile phone), which may report to the wireless communication network 100 through the small cell BS 110F. The wireless communication network 100 also may provide additional network efficiency through dynamic, low-latency TDD/FDD communications, such as in vehicle-to-vehicle (V2V) communications, as shown by UEs 120J-120L. Furthermore, the wireless communication network 100 may include one or more access points (APs) 107 that are part of one or more wireless local area networks (WLANs). The APs 107 (which also may be referred to as WLAN APs) may provide short-range wireless connectivity to the UEs 120 of the wireless communication network 100.

In some implementations, the wireless communication network 100 may utilize OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW also may be partitioned into subbands. In other instances, the subcarrier spacing and/or the duration of TTIs may be scalable.

The BSs 110 may assign or schedule transmission resources (such as in the form of time-frequency resource blocks (RB)) for downlink (DL) and uplink (UL) transmissions in the wireless communication network 100. DL refers to the transmission direction from a BS 110 to a UE 120, whereas UL refers to the transmission direction from a UE 120 to a BS 110. The communication can be in the form of radio frames. A radio frame may be divided into a plurality of subframes or slots. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (such as the DL subframes) in a radio frame may be used for DL transmissions, and another subset of the subframes (such as the UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 110 and the UEs 120. For example, a reference signal can have a particular pilot pattern or structure, where pilot tones may span across an operational BW or frequency band, each positioned at a pre-defined time and a pre-defined frequency. For example, a BS 110 may transmit cell-specific reference signals (CRSs) or channel state information reference signals (CSI-RSs) to enable a UE 120 to estimate a DL channel. Similarly, a UE 120 may transmit sounding reference signals (SRSs) to enable a BS 110 to estimate a UL channel. Control information may include resource assignments and protocol controls. Data may include protocol data and operational data. In some aspects, the BSs 110 and the UEs 120 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the wireless communication network 100 may be an NR network deployed over a licensed spectrum or an NR network deployed over an unlicensed spectrum (such as NR-U and NR-U lite networks). The BSs 110 can transmit synchronization signals, including a primary synchronization signal (PSS) and a secondary synchronization signal (SSS), in the wireless communication network 100 to facilitate synchronization. The BSs 110 can broadcast system information associated with the wireless communication network 100 (such as a master information block (MIB), remaining system information (RMSI), and other system information (OSI)) to facilitate initial network access. In some instances, the BSs 110 may broadcast one or more of the PSS, the SSS, and the MIB in the form of synchronization signal block (SSBs) over a physical broadcast channel (PBCH) and may broadcast one or more of the RMSI and the OSI over a physical downlink shared channel (PDSCH).

In some aspects, a UE 120 attempting to access the wireless communication network 100 may perform an initial cell search by detecting a PSS included in an SSB from a BS 110. The PSS may enable synchronization of period timing and may indicate a physical layer identity value. The UE 120 may receive an SSS included in an SSB from the BS 110. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 120 may receive an MIB. The MIB may include system information for initial network access and scheduling information for at least one of an RMSI and OSI. After decoding the MIB, the UE 120 may receive at least one of an RMSI and OSI. The RMSI and OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, and SRS.

After obtaining one or more of the MIB, the RMSI and the OSI, the UE 120 can perform a random access procedure to establish a connection with the BS 110. In some examples, the random access procedure may be a four-step random access procedure. For example, the UE 120 may transmit a physical random access channel (PRACH), such as a PRACH preamble, and the BS 110 may respond with a random access response (RAR). The RAR may include one or more of a detected random access preamble identifier (ID) corresponding to the PRACH preamble, timing advance (TA) information, a UL grant, a temporary cell-radio network temporary identifier (C-RNTI), and a backoff indicator. Upon receiving the RAR, the UE 120 may transmit a connection request to the BS 110 and the BS 110 may respond with a connection response. The connection response may indicate a contention resolution. In some examples, the PRACH, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 120 may transmit a PRACH (including a PRACH preamble) and a connection request in a single transmission and the BS 110 may respond by transmitting a RAR and a connection response in a single transmission.

After establishing a connection, the UE 120 and the BS 110 can enter a normal operation stage, where operational data may be exchanged. For example, the BS 110 may schedule the UE 120 for UL and DL communications. The BS 110 may transmit UL and DL scheduling grants to the UE 120 via a PDCCH. The BS 110 may transmit a DL communication signal to the UE 120 via a PDSCH according to a DL scheduling grant. The UE 120 may transmit a UL communication signal to the BS 110 via a PUSCH or PUCCH according to a UL scheduling grant.

In some aspects, the wireless communication network 100 may operate over a system BW or a component carrier BW. The wireless communication network 100 may partition the system BW into multiple bandwidth parts (BWPs). A BWP may be a certain portion of the system BW. For example, if the system BW is 100 MHz, the BWPs may each be 20 MHz or less. A BS 110 may dynamically assign a UE 120 to operate over a certain BWP. The assigned BWP may be referred to as the active BWP. The UE 120 may monitor the active BWP for signaling information from the BS 110. The BS 110 may schedule the UE 120 for UL or DL communications in the active BWP. In some implementations, the BS 110 may configure UEs 120 with narrowband operation capabilities (such as with transmission and reception limited to a BW of 20 MHz or less) to perform BWP hopping for channel monitoring and communications.

In some aspects, a BS 110 may assign a pair of BWPs within the component carrier to a UE 120 for UL and DL communications. For example, the BWP pair may include one BWP for UL communications and one BWP for DL communications. The BS 110 may additionally configure the UE 120 with one or more CORESETs in a BWP. A CORESET may include a set of frequency resources spanning a number of symbols in time. The BS 110 may configure the UE 120 with one or more search spaces for PDCCH monitoring based on the CORESETS. The UE 120 may perform blind decoding in the search spaces to search for DL control information (such as UL or DL scheduling grants) from the BS 110. For example, the BS 110 may configure the UE 120 with one or more of the BWPs, the CORESETS, and the PDCCH search spaces via RRC configurations.

In some aspects, the wireless communication network 100 may operate over a shared frequency band or an unlicensed frequency band, for example, at about 3.5 gigahertz (GHz), sub-6 GHz or higher frequencies in the mmWave band. The wireless communication network 100 may partition a frequency band into multiple channels, for example, each occupying about 20 MHz. The BSs 110 and the UEs 120 may be operated by multiple network operating entities sharing resources in the shared communication medium and may employ a LBT procedure to acquire channel occupancy time (COT) in the share medium for communications. A COT may be non-continuous in time and may refer to an amount of time a wireless node can send frames when it has won contention for the wireless medium. Each COT may include a plurality of transmission slots. A COT also may be referred to as a transmission opportunity (TXOP). The BS 110 or the UE 120 may perform an LBT in the frequency band prior to transmitting in the frequency band. The LBT can be based on energy detection or signal detection. For energy detection, the BS 110 or the UE 120 may determine that the channel is busy or occupied when a signal energy measured from the channel is greater than a certain signal energy threshold. For signal detection, the BS 110 or the UE 120 may determine that the channel is busy or occupied when a certain reservation signal (such as a preamble signal sequence) is detected in the channel.

Figure 2:
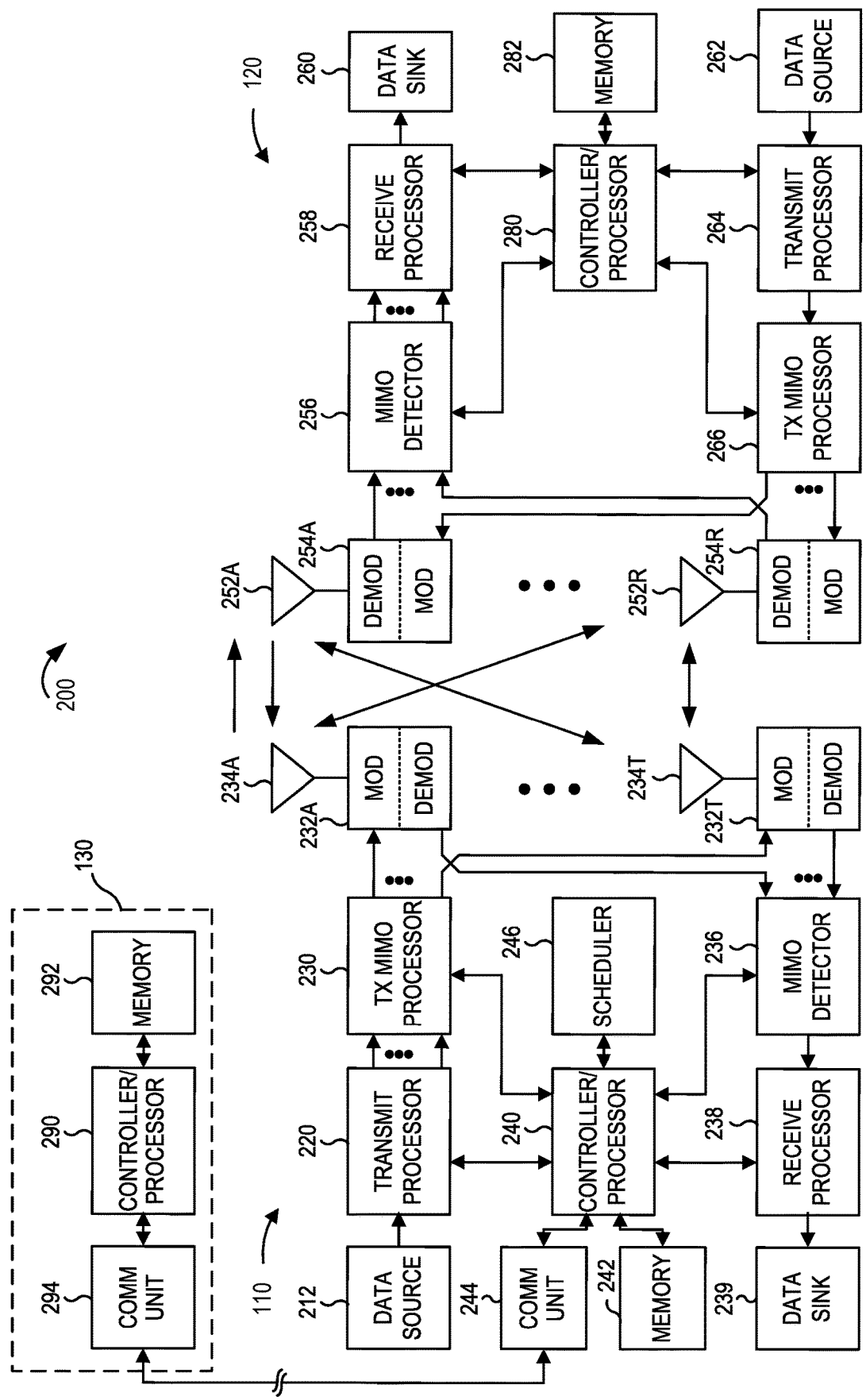
FIG. 2 is a block diagram conceptually illustrating an example of a base station (BS) in communication with a user equipment (UE).

FIG. 2 is a block diagram conceptually illustrating an example 200 of a BS 110 in communication with a UE 120. In some aspects, BS 110 and UE 120 may respectively be one of the BSs and one of the UEs in wireless communication network 100 of FIG. 1. BS 110 may be equipped with T antennas 234A through 234T, and UE 120 may be equipped with R antennas 252A through 252R, where in general T≥1 and R≥1.

At BS 110, a transmit processor 220 may receive data from a data source 212 for one or more UEs, select one or more modulation and coding schemes (MCS) for each UE based at least in part on channel quality indicators (CQIs) received from the UE, process (for example, encode and modulate) the data for each UE based at least in part on the MCS(s) selected for the UE, and provide data symbols for all UEs. The transmit processor 220 also may process system information (for example, for semi-static resource partitioning information (SRPI), etc.) and control information (for example, CQI requests, grants, upper layer signaling, etc.) and provide overhead symbols and control symbols. The transmit processor 220 also may generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators-demodulators (MODs-DEMODs) 232A through 232T (which also may be referred to as mods/demods or modems). Each MOD-DEMOD 232 may process a respective output symbol stream (for example, for OFDM, etc.) to obtain an output sample stream. Each MOD-DEMOD 232 may further process (for example, convert to analog, amplify, filter, and upconvert) the output sample stream to obtain a downlink signal. T downlink signals from MODs-DEMODs 232A through 232T may be transmitted via T antennas 234A through 234T, respectively. According to various aspects described in more detail below, the synchronization signals can be generated with location encoding to convey additional information.

At UE 120, antennas 252A through 252R may receive the downlink signals from BS 110 or other BSs and may provide received signals to modulators-demodulators (MODs-DEMODs) 254A through 254R, respectively (which also may be referred to as mods/demods or modems). Each MOD-DEMOD 254 may condition (for example, filter, amplify, downconvert, and digitize) a received signal to obtain input samples. Each MOD-DEMOD 254 may further process the input samples (for example, for OFDM, etc.) to obtain received symbols. A MIMO detector 256 may obtain received symbols from all R MODs-DEMODs 254A through 254R, perform MIMO detection on the received symbols if applicable, and provide detected symbols. A receive processor 258 may process (for example, demodulate and decode) the detected symbols, provide decoded data for UE 120 to a data sink 260, and provide decoded control information and system information to a controller or processor (controller/processor) 280. A channel processor may determine reference signal received power (RSRP), received signal strength indicator (RSSI), reference signal received quality (RSRQ), channel quality indicator (CQI), etc. In some aspects, one or more components of UE 120 may be included in a housing.

On the uplink, at UE 120, a transmit processor 264 may receive and process data from a data source 262 and control information (for example, for reports including RSRP, RSSI, RSRQ, CQI, etc.) from controller/processor 280. Transmit processor 264 also may generate reference symbols for one or more reference signals. The symbols from transmit processor 264 may be precoded by a TX MIMO processor 266 if applicable, further processed by MODs-DEMODs 254A through 254R (for example, for DFT-s-OFDM, CP-OFDM, etc.), and transmitted to BS 110. At BS 110, the uplink signals from UE 120 and other UEs may be received by antennas 234, processed by MOD-DEMOD 232, detected by a MIMO detector 236 if applicable, and further processed by a receive processor 238 to obtain decoded data and control information sent by UE 120. Receive processor 238 may provide the decoded data to a data sink 239 and the decoded control information to a controller or processor (i.e., controller/processor) 240. The BS 110 may include communication unit 244 and may communicate to network controller 130 via communication unit 244. The network controller 130 may include communication unit 294, a controller or processor (i.e., controller/processor) 290, and memory 292.

The controller/processor 240 of BS 110, the controller/processor 280 of UE 120, or any other component(s) of FIG. 2 may perform one or more techniques associated with initiating an expedited SSB handoff process, as described in more detail elsewhere herein. For example, the controller/processor 240 of BS 110, the controller/processor 280 of UE 120, or any other component(s) (or combinations of components) of FIG. 2 may perform or direct operations of, for example, the process depicted by flowchart 600 of FIG. 6 or other processes as described herein, such as the processes described in FIGS. 3-5. The memories 242 and 282 may store data and program codes for BS 110 and UE 120, respectively. A scheduler 246 may schedule UEs for data transmission on the downlink, the uplink, or a combination thereof.

Figure 3:
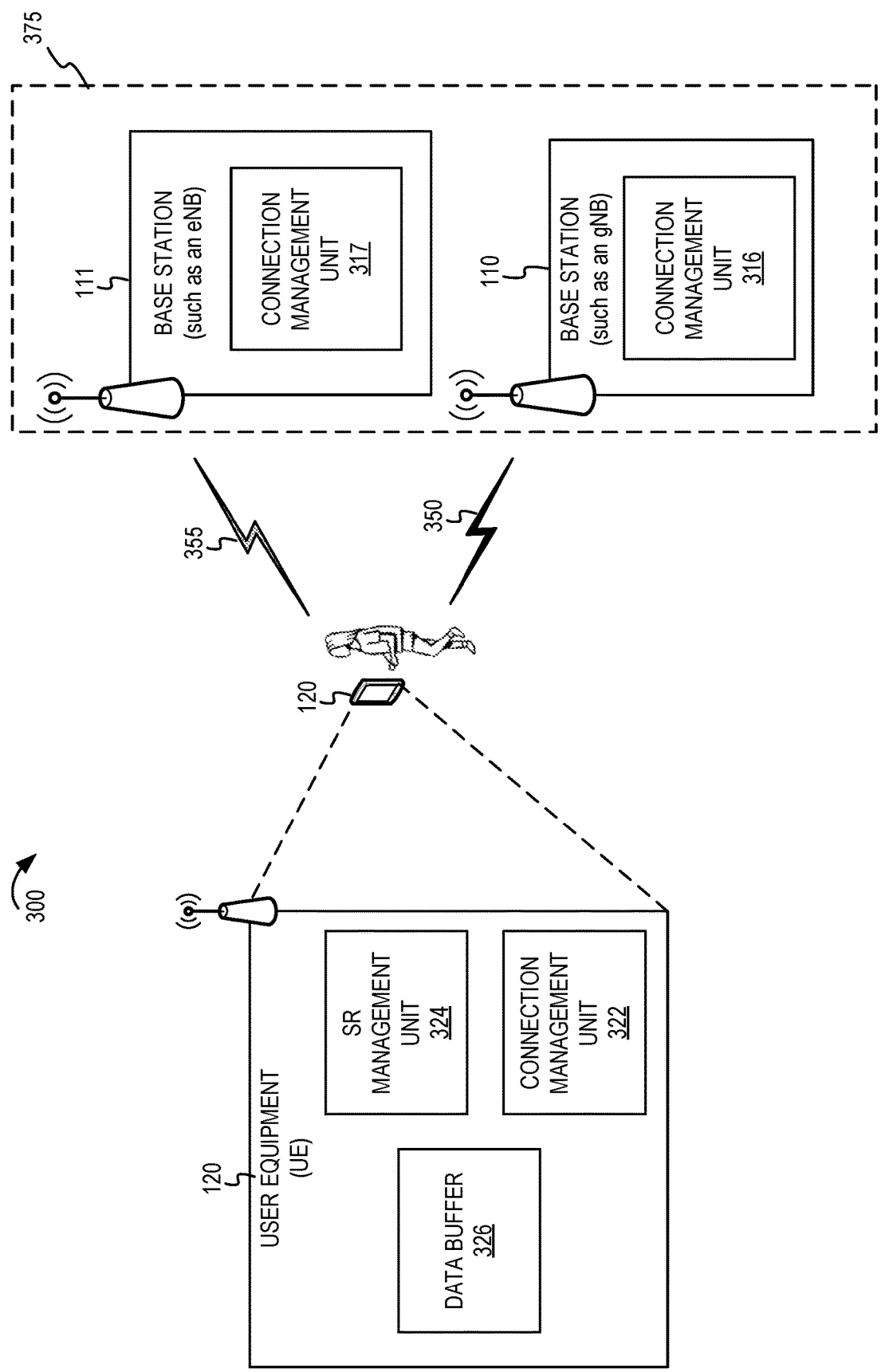
FIG. 3 shows a system diagram of an example wireless communication network including a UE that is configured to optimize the management of scheduling requests (SRs) for a split data radio bearer (DRB).
Figure 4:
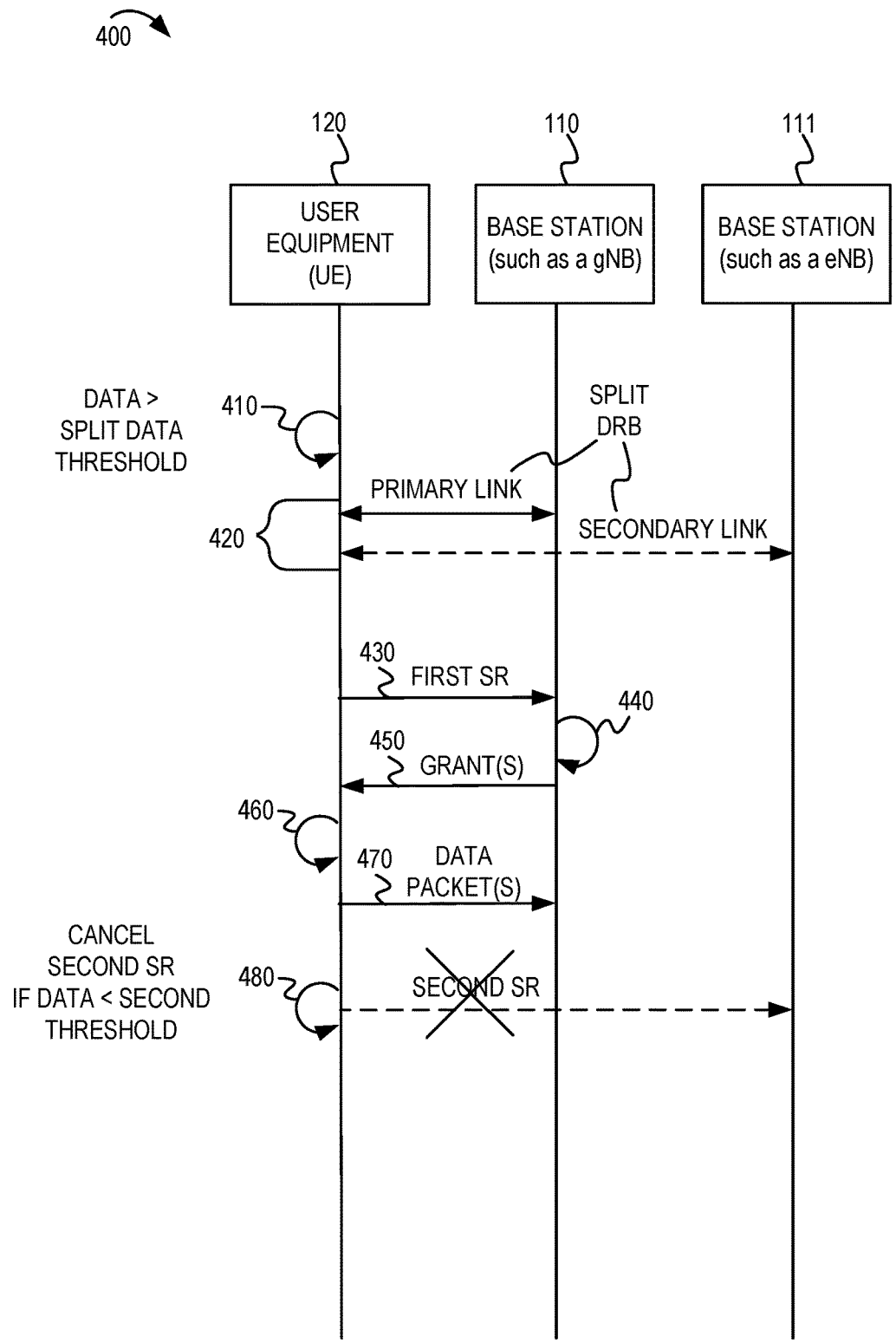
FIG. 4 shows an example message flow that shows a UE that is configured to optimize the management of SRs for a split DRB that uses a primary communication link and a secondary communication link.
Figure 5:
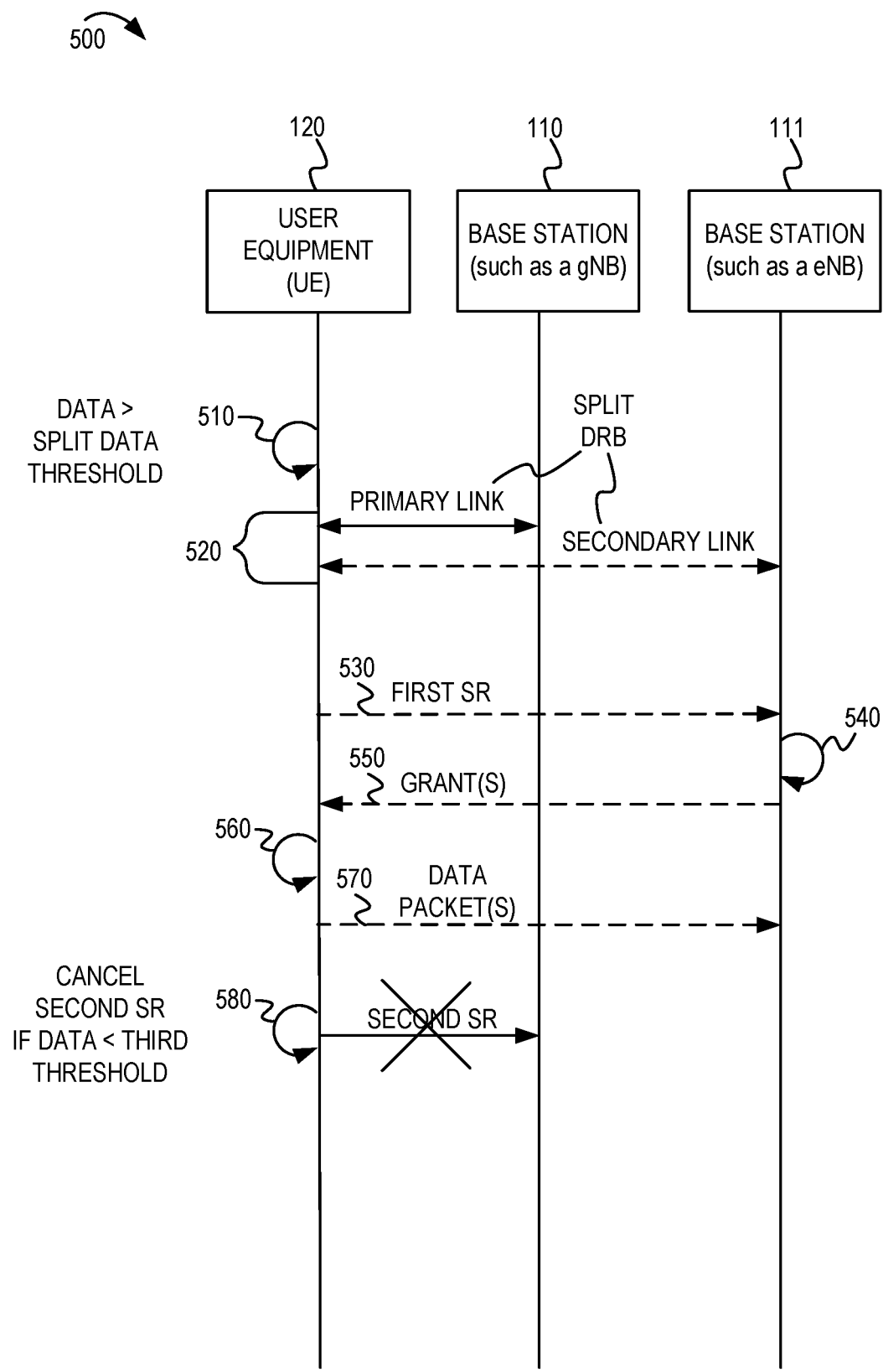
FIG. 5 shows another example message flow that shows a UE that is configured to optimize the management of SRs for a split DRB that uses a primary communication link and a secondary communication link.
Figure 6:
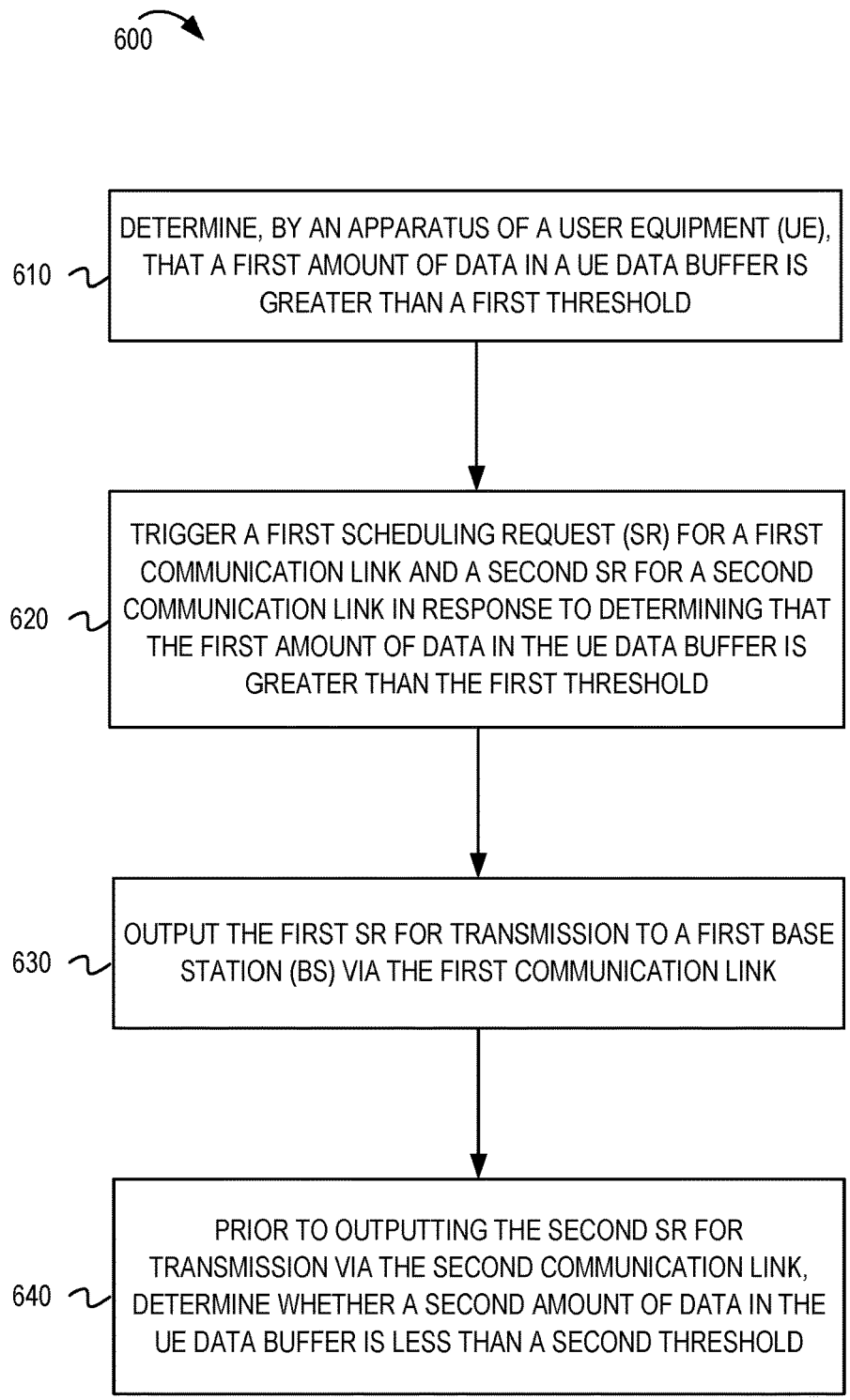
FIG. 6 depicts a flowchart with example operations performed by an apparatus of a UE for optimizing the management of SRs for a split DRB.

The stored program codes, when executed by the controller/processor 280 or other processors and modules at UE 120, may cause the UE 120 to perform operations described with respect to the process depicted by flowchart 600 of FIG. 6 or other processes as described herein, such as the processes described in FIGS. 3-5. The stored program codes, when executed by the controller/processor 240 or other processors and modules at BS 110, may cause the BS 110 to perform operations described with respect to the process depicted by flowchart 600 of FIG. 6 or other processes as described herein, such as the processes described in FIGS. 3-5. A scheduler 246 may schedule UEs for data transmission on the downlink, the uplink, or a combination thereof.

In some aspects, UE 120 may include means for performing the process depicted by flowchart 600 of FIG. 6 or other processes as described herein, such as the processes described in FIGS. 3-5. In some aspects, such means may include one or more components of UE 120 described in connection with FIG. 2.

In some aspects, BS 110 may include means for performing the process depicted by flowchart 600 of FIG. 6 or other processes as described herein, such as the processes described in FIGS. 3-5. In some aspects, such means may include one or more components of BS 110 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, the TX MIMO processor 266, or another processor may be performed by or under the control of controller/processor 280.

FIG. 3 shows a system diagram of an example wireless communication network including a UE 120 that is configured to optimize the management of SRs for a split DRB. The wireless communication network 300 shown in FIG. 3 is based on the example wireless communication network 100 described in FIG. 1. The wireless communication network 300 also may be referred to as a wide area network (WAN) or a wireless wide area network (WWAN). The wireless communication system 300 may include a UE 120, a BS 110, and a BS 111. The BS 110 and the BS 111 may have a Multi-Radio Dual Connectivity (MR-DC) architecture 375 and may be configured to operate in an MR-DC mode. The MR-DC mode may be Evolved Universal Terrestrial Radio Access (E-UTRA) NR Dual Connectivity (EN-DC) mode (which also may be referred to as LTE-NR DC mode), an NR-DC mode (which also may be referred to as NR-NR DC mode), or a WLAN and WWAN mode. As shown in FIG. 3, in some implementations, the BS 110 may be a gNB that may implement a 5G NR RAT and the BS 111 may be an eNB that may implement an LTE RAT, and the BS 110 and the BS 111 may be configured to operate in an EN-DC mode. Although not shown in FIG. 3, in some implementations, the BS 110 may be a gNB that may implement a 5G NR RAT and the BS 111 also may be a gNB that may implement a 5G NR RAT, and the BS 110 and the BS 111 may be configured to operate in an NR-DC mode. The UE 120 may be an example implementation of the UEs shown in FIGS. 1 and 2. The BS 110 and the BS 111 may each be an example implementation of the BSs shown in FIGS. 1 and 2. Although not shown for simplicity, the wireless communication system 300 may include one or more additional BSs and one or more additional UEs.

In some implementations, the UE 120 may include a connection management unit 322, an SR management unit 324, and a data buffer 326. The connection management 322 may perform operations to establish one or more DRBs (such as a split DRB) and one or more communication links with one or more BSs (such as BS 110 and BS 111). The connection management unit 322 also may manage the DRBs and the corresponding communication links. The SR management unit 324 may manage the SRs that are transmitted via one or more communication links. The SR management unit 324 may determine whether to transmit or cancel SRs based on the amount of data in the data buffer 326 and based on whether the UE has scheduled retransmissions, control messages, or status feedback messages, as further described herein. The data buffer 326 may be an UL data buffer and may store UL data associated with one or more DRBs (such as a split DRB) that is transmitted to the BSs, such as the BS 110 and the BS 111. A split DRB may be a single DRB that may be split between two UL communication links at the Radio Link Control (RLC) and the Media Access Control (MAC) layers. The UL communication links may be referred to as the primary communication link and the secondary communication link.

In some implementations, the BS 110 may include a connection management unit 316, and the BS 111 may include a connection management unit 317. The connection management units 316 and 317 may perform operations to establish one or more DRBs (such as a split DRB) and one or more communication links with one or more UEs (such as the UE 120) of the wireless communication network 300, and may manage the DRBs and the corresponding communication links. The connection management units 316 and 317 also may allocate UL resources and provide grants to the UEs in response to receiving SRs from the UEs, as further described herein.

In some implementations, when operating in a MR-DC mode (such as an EN-DC mode shown in FIG. 1), the UE 120 may establish a wireless connection (which may be referred to as a 5G NR communication link 350) with the BS 110 to obtain 5G NR service from a 5G NR network, and may establish a wireless connection (which may be referred to as an LTE communication link 355) with a BS 111 to obtain LTE service from an LTE network. In some implementations, when the UE 120 is operating in the EN-DC mode, the 5G NR communication link 350 associated with the BS 110 may be the primary communication link and the LTE communication link 355 associated with the BS 111 may be the secondary communication link. In some implementations, the LTE communication link 355 associated with the BS 111 may be the primary communication link and the 5G NR communication link 350 associated with the BS 110 may be the secondary communication link. In some implementations, when the UE 120 is operating in an NR-DC mode (not shown), one of the 5G NR communication links may be the primary communication link and the other 5G NR communication link may be the secondary communication link. In some implementations, a WLAN communication link may be the primary communication link and a WWAN communication link may be the secondary communication link.

In some implementations, after detecting data in the data buffer 326, the UE 120 may determine whether to request UL resources from at least one of the BS 110 and the BS 111. For example, after an idle period of the UE 120, the UE 120 may detect data in the data buffer 326. The data buffer 326 also may be referred to as UE data buffer or UL data buffer. The data may be received from an embedded application processor, a tethered host or other component of the UE 120. In some implementations, after detecting the data in the data buffer 326, the UE 120 may determine whether to request UL resources from the BS 110 via the 5G NR communication link 350, from the BS 111 via the LTE communication link 355, or from both the BS 110 and the BS 111. Since the UE 120 may not have UL resources on either link and the UE 120 may not have a PUSCH scheduled on either link, the UE 120 may determine whether to transmit a SR on at least one of the 5G NR communication link 350 and the LTE communication link 355. For example, the UE 120 may determine to trigger an SR (which may be referred to as a PUCCH-SR) in one or both of the links to request UL resources. After an SR is triggered in one or both of the links, the UE 120 may wait for an SR resource in one or both links in order to transmit the SR on the SR resource using a PUCCH in one or more of the links, as further described herein. The UE 120 also may request additional UL resources and provide a status of the data buffer 326 using a BSR via one or both of the links. For example, the UE 120 may provide a BSR using the grants received in response to transmitting an SR. The additional resources associated with the BSR may be used to flush out any remaining data in the data buffer 326 that did not fit in the grants that were received after the SR.

In some implementations, the UE 120 may determine whether a first amount of data in the data buffer 326 is greater than a split data threshold. The split data threshold also may be referred to as a first threshold, UL split data threshold, or ul-DataSplitThreshold. In some implementations, the split data threshold associated with a split DRB may be configured at the UE 120 by the BS (such as by the BS 110 or the BS 111) via the RRC information. As one non-limiting example, the split data threshold may be between 400 and 600 bytes of data. As another non-limiting example, the split data threshold may be between 300 bytes and 6.5 Megabytes (MBs) of data. The UE 120 may determine whether to trigger an SR to the BS 110 via the 5G NR communication link 350, whether to trigger an SR to the BS 111 via the LTE communication link 355, or whether to trigger an SR to both the BS 110 and the BS 111 based on whether the first amount of data in the data buffer 326 is greater than the split data threshold.

If the first amount of data in the data buffer 326 is greater than the split data threshold, the UE 120 may determine to trigger an SR to both the BS 110 and the BS 111 in order to split the data across both the primary communication link and the secondary communication link. For example, the UE 120 may determine to trigger a first SR to the BS 110 via the 5G NR communication link 350 using a PUCCH, and also trigger a second SR to the BS 111 via the LTE communication link 355 using a PUCCH. The UE 120 may trigger an SR to both the BS 110 and the BS 111 in order to use both links to drain the data in the data buffer 326. In some implementations, the UE 120 may determine to trigger an SR to both the BS 110 and the BS 111 if the first amount of data in the data buffer 326 is greater than or equal to the split data threshold.

If the first amount of data in the data buffer 326 is less than the split data threshold, the UE 120 may determine to request UL resources from one of the BS 110 or the BS 111, whichever is configured as the primary communication link, and trigger an SR to the corresponding BS 110 or the BS 111. For example, if the first amount of data in the data buffer 326 is less than the split data threshold, the UE 120 may determine to request UL resources from the primary communication link, and transmit an SR via the primary communication link.

In some implementations, when the UE 120 determines to trigger an SR to both the BS 110 and the BS 111, the UE 120 may transmit a first SR via either the primary communication link or the secondary communication link depending on various aspects. An SR may be transmitted on the PUCCH-SR resource that is configured by the RRC and dedicated to the UE 120. The PUCCH-SR resource may be specific to the RAT. For example, an SR transmitted via the LTE communication link may receive LTE grants for the UE, and an SR transmitted via the 5G NR communication link may receive 5G NR grants for the UE. The PUCCH-SR resource may be periodic. For example, the PUCCH-SR may occur every 1 ms, every 10 ms, every 80 ms, among others. After the SRs are triggered in both communication links, the delay until SR transmission may depend on when that next PUCCH-SR occasion occurs and whether UE 120 can complete its wakeup in time to use the next PUCCH-SR or one of the subsequent PUCCH-SRs. For at least these reasons, the UE 120 may transmit an SR earlier in one of the links, and this SR may be referred to as the first SR. For example, the first SR may be triggered in one of the links and may be transmitted earlier than in the other link. Even if the first SR and a second SR are triggered at approximately the same time (or at the same time) in different links, the first SR may be transmitted earlier than the second SR. In some instances, the UE 120 may prepare and transmit the first SR via the primary communication link. In some instances, the UE 120 may prepare and transmit the first SR via the secondary communication link.

In some implementations, after the SR is triggered on both communication links, if the UE 120 transmits the first SR via the primary communication link, the UE 120 may receive one or more grants via the primary communication link from the corresponding BS (such as the BS 110). For example, the UE 120 may receive one or more grants via the primary communication link while the SR on the secondary communication link is still triggered (or pending) and waiting for an SR resource occasion. The one or more grants allows the UE 120 to transmit UL data to the corresponding BS by allocating UL resources. After receiving one or more grants via the primary communication link, the UE 120 may transmit one or more data packet via the primary communication link that include a portion or all of the data in the data buffer 326. Additionally, a second SR may have been triggered in the other communication link, which in this case may be the secondary communication link.

In some implementations, after the second SR is triggered and prior to transmission of the second SR via the secondary communication link, the UE 120 may determine whether to perform or cancel the transmission of the second SR based on a second amount of data in the data buffer 326, which may be modified by the data transmissions performed by the primary communication link. For example, the UE 120 may determine whether the second amount of data in the data buffer 326 is less than a second threshold in order to determine whether or not to cancel the transmission of the second SR. In some implementations, the second threshold may be the split data threshold. In some implementations, the second threshold may be a threshold byte of data or zero bytes of data (the data buffer 326 is empty). In some implementations, the second threshold may be one of various different thresholds (such as one of various predefined thresholds) or the second threshold may be configurable as needed. After the UE 120 transmits the data packet that includes at least a portion of the data in the data buffer 326 via the primary communication link, the amount of data may change from a first amount of data to a second amount of data. Also, additional data may be delivered to the data buffer 326.

The second amount of data may or may not be greater than the second threshold. In some implementations, the second amount of data may be the sum of the data associated with the split DRB and the data of any other RAT-specific bearers of the UE 120 associated with the same SR configuration as the split DRB. For example, if the secondary communication link is associated with an LTE RAT, the second amount of data may be the sum of the data associated with the split DRB and the data of any other LTE RAT specific bearers of the UE 120 associated with the same SR configuration as the split DRB. The second amount of data also may be zero if the primary communication link drained all of the data from the data buffer 326 associated with the split DRB and there is no additional data for any other LTE RAT specific bearers of the UE 120 (or there is no LTE RAT specific bearers) with the same SR configuration as the split DRB.

In some implementations, if the second amount of data in the data buffer 326 is less than the second threshold, the UE 120 may cancel the second SR (which also may be referred to as the second triggered SR) prior to transmission of the second SR via the secondary communication link. Since the second amount of data is less than the second threshold, the split DRB that uses both the primary and secondary communication links may not be needed anymore. Instead, the UE 120 may use the primary communication link to transmit the data in the data buffer 326, as long as the amount of data remains below the second threshold (such as the split data threshold). The UE 120 checking the amount of data in the data buffer 326 prior to transmission of the second SR allows the UE 120 to cancel any unnecessary SR prior to transmission, and thus prevents receipt of any unnecessary grants from the corresponding BS.

In some implementations, in addition to determining whether the second amount of data is less than the second threshold, the UE 120 may determine whether the secondary communication link has any data retransmissions, control messages, or status feedback messages scheduled for transmission via the secondary communication link. In some implementations, if the second amount of data in the data buffer 326 is less than the second threshold and the UE 120 does not have data retransmissions, control messages, or status feedback messages scheduled for transmission via the secondary communication link, the UE 120 may cancel the second SR prior to transmission of the second SR via the secondary communication link.

In some implementations, if the second amount of data in the data buffer 326 is greater than or equal to the second threshold, the UE 120 may proceed with transmission of the second SR via the secondary communication link. If the second amount of data in the data buffer 326 is greater than or equal to the second threshold, the UE 120 may continue with the split DRB that uses both the primary and secondary communication links. In some implementations, if the second amount of data in the data buffer 326 is greater than or equal to the second threshold or the UE 120 has data retransmissions, control messages, or status feedback messages scheduled for transmission via the secondary communication link, the UE 120 may proceed with transmission of the second SR via the secondary communication link. After transmission of the second SR, the UE 120 may receive one or more grants from the corresponding BS (such as the BS 111) for the secondary communication link.

In some implementations, after the SR is triggered on both communication links, if the UE 120 transmits the first SR via the secondary communication link, the UE 120 may receive one or more grants via the secondary link from the corresponding BS (such as the BS 111). For example, the UE 120 may receive one or more grants via the secondary communication link while the SR on the primary communication link is still triggered (or pending) and waiting for an SR resource occasion. The one or more grants allows the UE 120 to transmit UL data to the corresponding BS by allocating UL resources. After receiving one or more grants via the secondary communication link, the UE 120 may transmit a data packet via the secondary communication link that includes a portion or all of the data in the data buffer 326. Additionally, a second SR may have been triggered in the other communication link, which in this case may be the primary communication link.

In some implementations, after the second SR is triggered and prior to transmission of the second SR via the primary communication link, the UE 120 may determine whether to perform or cancel the transmission of the second SR based on a second amount of data in the data buffer 326, which may be modified by the data transmissions performed by the secondary communication link. For example, the UE 120 may determine whether the second amount of data in the data buffer 326 is less than a third threshold in order to determine whether or not to cancel the second SR. In some implementations, the third threshold may be a threshold byte of data or zero bytes of data (the data buffer 326 is empty). In some implementations, the third threshold may be the split data threshold. In some implementations, the third threshold may be one of various different thresholds (such as one of various predefined thresholds) or the second threshold may be configurable as needed. After the UE 120 transmits the data packet that includes at least a portion of the data in the data buffer via the secondary communication link, the amount of data may change from a first amount of data to a second amount of data. Also, additional data may be delivered to the data buffer 326.

The second amount of data may or may not be greater than the third threshold. In some implementations, the second amount of data may be the sum of the data associated with the split DRB and the data of any other RAT-specific bearers of the UE 120 associated with the same SR configuration as the split DRB. For example, if the primary communication link is associated with a 5G NR RAT, the second amount of data may be the sum of the data associated with the split DRB and the data of any other 5G NR RAT specific bearers of the UE 120 associated with the same SR configuration as the split DRB. The second amount of data also may be zero if the secondary communication link drained all of the data from the data buffer 326 associated with the split DRB and there is no additional data for any other 5G NR RAT specific bearers of the UE 120 (or there is no 5G NR RAT specific bearers) with the same SR configuration as the split DRB.

In some implementations, if the second amount of data in the data buffer 326 is less than the third threshold, the UE 120 may cancel the second SR prior to transmission of the second SR via the primary communication link. In some implementations, if the second amount of data in the data buffer 326 is less than the third threshold, the UE 120 may cancel the second SR prior to transmission of the second SR via the primary communication link. In some implementations, when the UE 120 checks whether the second amount of data is zero to determine whether to transmit or cancel the second SR via the primary communication link, the UE 120 may still transmit the second SR if the second amount of data is non-zero, regardless of whether the second amount of data is greater than or less than the split data threshold. For example, if the second amount of data in the data buffer 326 is non-zero, the UE 120 may transmit the second SR to the corresponding BS (such as the BS 110) via the primary communication link. If the UE 120 determines that there is no data remaining in the UL data 326, the UE 120 may cancel the second SR prior to transmission in order to prevent receipt of any unnecessary grants from the corresponding BS (such as the BS 110).

In some implementations, in addition to determining whether the second amount of data is less than the third threshold, the UE 120 may determine whether the secondary communication link has any data retransmissions, control messages, or status feedback messages scheduled for transmission via the secondary communication link. In some implementations, the UE 120 may cancel the second SR prior to transmission of the second SR via the primary communication link if the second amount of data is less than the third threshold and the UE 120 does not have data retransmissions, control messages, or status feedback messages scheduled for transmission via the primary communication link.

In some implementations, the second SR transmission that is canceled by the UE 120 may be an initially scheduled transmission of the second SR. In some implementations, the second SR transmission that is canceled by the UE 120 may be a scheduled retransmission of the second SR. For example, when a retransmission of the second SR is triggered some time after original transmission of the second SR, the UE 120 may determine the amount of data in the data buffer 326 to determine whether or not to transmit the retransmission of the second SR. As described herein, the UE 120 may determine whether the amount of data in the data buffer 326 is less than a threshold (such as the split data threshold) to determine whether to transmit the second SR. If the amount of data in the data buffer 326 is greater than or equal to the threshold, the UE 120 may transmit the second SR. In some implementations, if a retransmission of the second SR is triggered (such as due to the failed transmission of one or more data packets), the UE 120 may determine whether the amount of data in the data buffer 326 is less than the threshold (such as the split data threshold). If the amount of data in the data buffer 326 is less than the threshold, the UE 120 may cancel the retransmission of the second SR. If the amount of data in the data buffer 326 is greater than or equal to the threshold, the UE 120 may proceed with the retransmission of the second SR.

In some implementations, the UE 120 may determine whether the communication link (either the primary or secondary communication link) associated with the second SR has any data retransmissions, control messages, or status feedback messages scheduled for transmission by determining whether the UE 120 has any pending Radio Link Control (RLC) or Packet Data Convergence Protocol (PDCP) retransmissions, control messages, or status feedback messages. For example, one of the data packets the UE 120 previously sent may have failed and the UE 120 may have scheduled a retransmission of the data packet.

In some implementations, the UE 120 may trigger a first SR only in an active communication link and the UE 120 may wait to determine whether to trigger a second SR in a communication link that is asleep until after the communication link is activated (or wakes up). As described herein, after data is received in the data buffer 326, the UE 120 may determine whether a first amount of data in the data buffer 326 is greater than a split data threshold in order to determine whether to trigger a first SR in a first communication link (either in the primary communication link or in the secondary communication link) and trigger a second SR in a second communication link (either in the primary communication link or in the secondary communication link). In some implementations, if a first SR is triggered at a first time instant (such as time t0) in a primary communication link after determining the first amount of data in the data buffer 326 is greater than the split data threshold, the UE 120 may delay triggering a second SR in a secondary communication link if the secondary communication is asleep (or not active) at the first time instant. For example, if the secondary communication link is asleep, the UE 120 may delay determining whether to trigger the second SR in the secondary communication link until after the secondary communication link wakes up (or enters an active state). If the secondary communication link is scheduled to wake up at a second time instant (such as time ti), the UE 120 may determine whether a second amount of data in the data buffer 326 at the second time instant (after the secondary communication link wakes up) is greater than the split data threshold. If the second amount of data in the data buffer 326 is greater than the split data threshold after the secondary communication link wakes up, the UE 120 may trigger the second SR in the secondary communication link. If not, the UE 120 may not trigger the second SR in the secondary communication link. If the UE 120 triggers the second SR in the secondary communication link after the secondary communication link wakes up, prior to transmission of the second SR via the secondary communication link, the UE 120 may determine whether to perform or cancel the transmission of the second SR based on a third amount of data in the data buffer 326. For example, if the third amount of data in the data buffer 326 is less than a threshold (such as the split data threshold), the UE 120 may cancel the transmission of the second SR. If the third amount of data in the data buffer 326 is greater than or equal to the threshold, the UE 120 may proceed with the transmission of the second SR.

In some implementations, if the primary communication link is asleep and the secondary communication link is awake at a first time instant (such as time t0), the first SR may be triggered in the secondary communication link. If the primary communication link is asleep, the UE 120 may delay determining whether to trigger the second SR in the primary communication link until after the primary communication link wakes up (or enters an active state). If the primary communication link is scheduled to wake up at a second time instant (such as time ti), the UE 120 may determine whether a second amount of data in the data buffer 326 at the second time instant (after the primary communication link wakes up) is greater than a threshold. In some implementations, the threshold may be a threshold byte of data or zero bytes of data (the data buffer 326 is empty). In some implementations, the threshold may be the split data threshold. If the second amount of data in the data buffer 326 is greater than the threshold after the primary communication link wakes up, the UE 120 may trigger the second SR in the primary communication link. If the UE 120 triggers the second SR in the primary communication link after the primary communication link wakes up, prior to transmission of the second SR via the primary communication link, the UE 120 may determine whether to perform or cancel the transmission of the second SR based on a third amount of data in the data buffer 326. For example, if the third amount of data in the data buffer 326 is less than a threshold, the UE 120 may cancel the transmission of the second SR. If the third amount of data in the data buffer 326 is greater than or equal to the threshold, the UE 120 may proceed with the transmission of the second SR. In some implementations, the threshold may be a threshold byte of data or zero bytes of data (the data buffer 326 is empty). In some implementations, the threshold may be the split data threshold.

In some implementations, if the UE 120 determines to cancel the second SR (either in the primary communication link or in the secondary communication link), the UE 120 may wait to cancel the second SR until a threshold time period before the second SR is scheduled for transmission. For example, the UE 120 may wait to cancel the second SR until a time period between the time instant the second SR is triggered and the time instant the second SR is scheduled for transmission. In some implementations, the time period the second SR is canceled may be a threshold time period before the time instant the second SR is scheduled for transmission. Waiting until a threshold time period before the second SR is scheduled for transmission to cancel the second SR may avoid the situation where additional data is received at the data buffer 326 for the corresponding RAT and the second SR is re-triggered. For example, if the UE 120 cancels the second SR at a first time instant, and the data buffer 326 received data at a second time instant after the first time instant, the second SR may be re-triggered, which also may cause grant delays. Thus, waiting to cancel the second SR until a threshold time period before the second SR is scheduled for transmission may allow the UE 120 to determine if additional is received by the data buffer 326. If additional data is received, the UE 120 may determine whether to proceed with the cancellation of the second SR transmission or whether to proceed with the second SR transmission (and thus not cancel the second SR). For example, the UE 120 may use the criteria described herein regarding the amount of data in the data buffer 326 for either the primary communication link or the second communication link to determine whether to proceed with the cancellation of the second SR transmission or whether to proceed with the second SR transmission (and thus not cancel the second SR). In some implementations, the UE 120 also may cancel the BSR that triggered the second SR if the second SR is canceled.

In some implementations, the configuration of the split DRB may change one or more times during a data flow. For example, the primary and secondary communication links may be switched or the value of the split data threshold may be changed. For example, if the 5G NR communication link 350 is the primary communication link and the LTE communication link 355 is the secondary communication link, a change in the configuration of the split DRB may result in the 5G NR communication link 350 being the secondary communication link and the LTE communication link 355 being the primary communication link. As another example, since the split data threshold may be configurable, a change in the configuration of the split DRB may change the value of the split data threshold. In some implementations, prior to a change in the configuration of the split DRB, the amount of data in the data buffer 326 may be greater than the split data threshold. However, if the split DRB configuration is changed after an SR is triggered and prior to the transmission of the SR in one of the communication links, the change in the split DRB configuration may result in the cancellation of the SR if the split data threshold is changed. For example, the change in the DRB configuration may increase the value of the split data threshold, and thus the amount of data in the data buffer 326 may be less than the threshold after the configuration change. Thus, even if the UE 120 previously determined that the amount of data in the data buffer 326 was greater than the split data threshold, if the UE 120 detects that the amount of data is now less than the updated split data threshold prior to transmission of the SR, the UE 120 may cancel the SR transmission.

In some implementations, the UE 120 may implement a skip UL transmission feature (which may be referred to as a skipULTxDynamic feature) that skips an UL transmission (such as a pending SR) on a received grant if the UL transmission meets an UL transmission criterion and if the skipULTxDynamic feature is supported by the UE 120. The UL transmission criterion may be that the data buffer 326 is empty, and thus the UE 120 does not have any data to transmit. With the skipULTxDynamic feature, if the data buffer 326 is not empty, the UE 120 may not skip the UL transmission and thus may the UE 120 may not cancel the pending SR. Also, the UE 120 may not support the skipULTxDynamic feature or the skipULTxDynamic feature may be disabled. In some implementations, when the UE 120 supports the skipULTxDynamic feature and the skipULTxDynamic feature is enabled, the UE 120 may cancel an SR if there is no data in the data buffer 326 (for the primary communication link) or the data in the data buffer 326 is less than the split data threshold (for the secondary communication link).

In some implementations, the UE 120 may stop, cancel, or adjust one or more SR-related timers if the UE 120 cancels the second SR. For example, the UE 120 may implement an SR prohibit timer (which also may be referred to as sr-ProhibitTimer) and a logical channel SR delay timer (which also may be referred to as logicalChannelSR-DelayTimer) that typically delay the next SR attempt for a period of time after each SR is transmitted. In some implementations, when the UE 120 cancels the second SR, the UE 120 may stop, cancel, or adjust the SR prohibit timer and the logical channel SR delay timer in order to allow a subsequent SR without the timer restrictions since the second SR was canceled.

In some implementations, the UE 120 may determine whether to cancel an SR when the DRB is not a split DRB. For example, the DRB may be an LTE DRB that uses an LTE communication link or a 5G NR DRB that uses a 5G NR communication link. In some implementations, the UE 120 may determine that the data buffer 326 has a first amount of data. The UE 120 may determine to trigger an SR in a communication link associated with the DRB after determining that the data buffer 326 has the first amount of data. For example, if the UE 120 is connected with the BS 110, the UE 120 may determine to trigger an SR in the 5G NR communication link 350. As another example, if the UE 120 is connected with the BS 111, the UE 120 may determine to trigger an SR in the LTE communication link 355. After the SR is triggered and prior to transmission of the SR, the data in the data buffer 326 may be discarded. For example, the data in the data buffer 326 may be discarded due to a PDCP discard timer or due to another internal process. In some implementations, prior to transmitting the SR via the communication link, the UE 120 may determine whether a second amount of data in the data buffer 326 is less than a threshold. For example, the UE 120 may determine whether the second amount of data in the data buffer 326 is less than a threshold byte of data. As another example, the UE 120 may determine whether the second amount of data in the data buffer 326 is equal to zero bytes of data, such as when the data buffer 326 is empty.

In some implementations, after the SR is triggered and prior to transmission of the SR via the communication link, the UE 120 may determine whether to perform or cancel the transmission of the SR based on a second amount of data in the data buffer 326. In some implementations, when the second amount of data in the data buffer 326 is less than the threshold, the UE 120 may determine to cancel the SR prior to transmission of the SR via the communication link. For example, if the data in the data buffer 326 is discarded after the SR is triggered and prior to transmission of the SR, the UE 120 may cancel the SR because the data buffer 326 is empty. In some implementations, the UE 102 may cancel the SR a threshold time period before the SR is scheduled for transmission via the communication link. In some implementations, the UE 120 also may cancel the BSR that triggered the SR if the SR is canceled.

In some implementations, in addition to determining whether the second amount of data is less than the threshold prior to transmission of the SR, the UE 120 also may determine whether the communication link has any data retransmissions, control messages, or status feedback messages scheduled for transmission via the communication link. In some implementations, the UE 120 may cancel the SR prior to transmission of the SR via the communication link if the second amount of data is less than the threshold and the UE 120 does not have data retransmissions, control messages, or status feedback messages scheduled for transmission via the communication link.

FIG. 4 shows an example message flow that shows a UE that is configured to optimize the management of SRs for a split DRB that uses a primary communication link and a secondary communication link. The message flow diagram 400 includes the UE 120, the BS 110, and the BS 111 that are described in FIG. 3.

At 410, the UE 120 may determine whether a first amount of data in a data buffer (such as an UL data buffer) is greater than or equal to a split data threshold.

At 420, if the UE 120 determines that the first amount of data is greater than or equal to the split data threshold, the UE 120 may trigger an SR in both communication links associated with a split DRB in order to split the transmission of the data in the data buffer across both a primary communication link (which also may be referred to as primary link and is represented in FIG. 4 by the solid arrow) and a secondary communication link (which also may be referred to as secondary link and is represented in FIG. 4 by the dashed arrow). For example, the UE 120 may determine to trigger a first SR to the BS 110 via the primary communication link and trigger a second SR to the BS 111 via the secondary communication link.

As described in FIG. 3, in some implementations, when the UE 120 is operating in the EN-DC mode, the primary communication link may connect the UE 120 to the BS 110 that implements the 5G NR RAT and the secondary communication link may connect the UE 120 to the BS 111 that implements the LTE RAT. In some implementations, the primary communication link may connect the UE 120 to the BS 111 that implements the LTE RAT and the secondary communication link may connect the UE 120 to the BS 110 that implements the 5G NR RAT. In some implementations, when the UE 120 is operating in an NR-DC mode, both the BS 110 and the BS 111 may implement the 5G NR RAT and one of the 5G NR communication links may be the primary communication link and the other 5G NR communication link may be the secondary communication link.

At 430, the UE 120 may transmit the first SR to the BS 110 via the primary communication link. Even if the first SR and a second SR are triggered at approximately the same time (or at the same time) in different links, the UE 120 may prepare and transmit one of the SRs (such as the first SR via the primary communication link) earlier than the other SR (such as the second SR via the secondary communication link).

At 440, the BS 110 may receive and process the first SR and determine to provide one or more grants to the UE 120 to allocate UL resources.

At 450, the BS 110 may transmit the one or more grants to the UE 120 via the primary communication link.

At 460, the UE 120 may receive and process the one or more grants. Based on the received one or more grants, the UE 120 may determine to prepare one or more data packets for transmission to the BS 110.

At 470, the UE 120 may transmit the one or more data packets to the BS 110 via the primary communication link. The one or more data packets may include at least a portion of the data (or all of the data) in the data buffer.

At 480, the UE 120 may determine whether or not to cancel the second SR transmission via the secondary communication link based on whether a second amount of data in the data buffer is less than the second threshold (such as the split data threshold). The UE 120 may cancel the second SR (as shown in FIG. 4) transmission if the second amount of data in the data buffer is less than the second threshold. As described in FIG. 3, before canceling the second SR, the UE 120 also may confirm that the UE 120 does not have any scheduled retransmissions, control messages, or status feedback messages. As described in FIG. 3, in some implementations, the UE 120 may wait to cancel the second SR until a threshold time period prior to the time instant the second SR is scheduled for transmission. If the second amount of data in the data buffer is greater than or equal to the second threshold, the UE 120 may proceed with the second SR transmission via the secondary communication link (not shown).

FIG. 5 shows another example message flow that shows a UE that is configured to optimize the management of SRs for a split DRB that uses a primary communication link and a secondary communication link. The message flow diagram 500 includes the UE 120, the BS 110, and the BS 111 that are described in FIG. 3.

At 510, the UE 120 may determine whether a first amount of data in a data buffer (such as an UL data buffer) is greater than or equal to a split data threshold.

At 520, if the UE 120 determines that the first amount of data is greater than or equal to the split data threshold, the UE 120 may trigger an SR in both communication links associated with a split DRB in order to split the transmission of the data in the data buffer across both a primary communication link (which also may be referred to as primary link and is represented in FIG. 5 by the solid arrow) and a secondary communication link (which also may be referred to as secondary link and is represented in FIG. 5 by the dashed arrow). For example, the UE 120 may determine to trigger a first SR to the BS 111 via the secondary communication link and trigger a second SR to the BS 110 via the primary communication link.

As described in FIG. 3, in some implementations, when the UE 120 is operating in the EN-DC mode, the primary communication link may connect the UE 120 to the BS 110 that implements the 5G NR RAT and the secondary communication link may connect the UE 120 to the BS 111 that implements the LTE RAT. In some implementations, the primary communication link may connect the UE 120 to the BS 111 that implements the LTE RAT and the secondary communication link may connect the UE 120 to the BS 110 that implements the 5G NR RAT. In some implementations, when the UE 120 is operating in an NR-DC mode, both the BS 110 and the BS 111 may implement the 5G NR RAT and one of the 5G NR communication links may be the primary communication link and the other 5G NR communication link may be the secondary communication link.

At 530, the UE 120 may transmit the first SR to the BS 111 via the secondary communication link. Even if the first SR and a second SR are triggered at approximately the same time (or at the same time) in different links, the UE 120 may prepare and transmit one of the SRs (such as the first SR via the secondary communication link) earlier than the other SR (such as the second SR via the primary communication link).

At 540, the BS 111 may receive and process the first SR and determine to provide one or more grants to the UE 120 to allocate UL resources.

At 550, the BS 111 may transmit the one or more grants to the UE 120 via the secondary communication link.

At 560, the UE 120 may receive and process the one or more grants. Based on the received one or more grants, the UE 120 may determine to prepare one or more data packets for transmission to the BS 111.

At 570, the UE 120 may transmit the one or more data packets to the BS 111 via the secondary communication link. The one or more data packets may include at least a portion of the data (or all of the data) in the data buffer.

At 580, the UE 120 may determine whether or not to cancel the second SR transmission via the primary communication link based on the second amount of data in the data buffer. For example, the UE 120 may determine to cancel the second SR transmission (as shown in FIG. 5) via the primary communication link if the second amount of data in the data buffer is less than the third threshold. In some implementations, the third threshold may be a threshold byte of data or zero bytes of data (the data buffer is empty). For example, the UE 120 may determine that the data transmission via the secondary communication link drained all of the data from the data buffer and therefore the data buffer is empty. The UE 120 may cancel the second SR transmission if the data buffer is empty. In some implementations, the third threshold may be the split data threshold. As described in FIG. 3, before canceling the second SR, the UE 120 also may confirm that the UE 120 does not have any scheduled retransmissions, control messages, or status feedback messages. As described in FIG. 3, in some implementations, the UE 120 may wait to cancel the second SR until a threshold time period prior to the time instant the second SR is scheduled for transmission. If the second amount of data in the data buffer is greater than zero, the UE 120 may proceed with the second SR transmission via the primary communication link (not shown).

FIG. 6 depicts a flowchart 600 with example operations performed by an apparatus of a UE for optimizing the management of SRs for a split DRB.

At block 610, the apparatus of the UE may determine that a first amount of data in a UE data buffer is greater than a first threshold.

At block 620, the apparatus of the UE may trigger a first SR for a first communication link and a second SR for a second communication link in response to determining that the first amount of data in the UE data buffer is greater than the first threshold.

At block 630, the apparatus of the UE may output the first SR for transmission to a first BS via the first communication link.

At block 640, the apparatus of the UE may, prior to outputting the second SR for transmission via the second communication link, determine whether a second amount of data in the UE data buffer is less than a second threshold. In some implementations, the apparatus of the UE may cancel the second SR at the UE prior to outputting the second SR for transmission to a second BS via the second communication link in response to the second amount of data in the UE data buffer being less than the second threshold.

Figure 7:
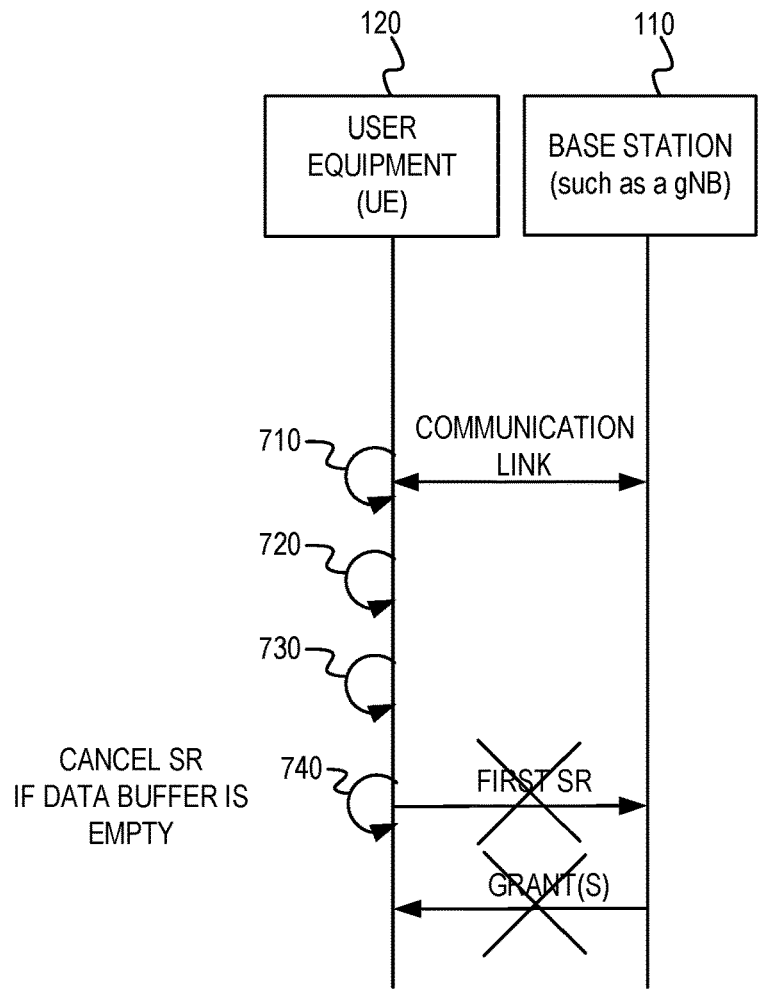
FIG. 7 shows an example message flow that shows a UE that is configured to optimize the management of SRs for a DRB that uses a single communication link.

FIG. 7 shows an example message flow that shows a UE that is configured to optimize the management of SRs for a DRB that uses a single communication link. The message flow diagram 700 includes the UE 120 and the BS 110 that are described in FIG. 3. Although FIG. 7 shows a BS that implements a 5G NR RAT (such as BS 110), the BS also may implement an LTE RAT (such as the BS 111).

At 710, the UE 120 may determine a first amount of data in a data buffer (such as an UL data buffer) and may trigger an SR in a communication link associated with the BS 110 in response to determining the first amount of data in the data buffer. For example, the UE 120 may determine that one or more bytes of data arrived at the data buffer, and may trigger an SR in the communication link in response to detecting the data in the data buffer.

At 720, after the UE 120 triggers the SR and prior to transmission of the SR via the communication link, the data in the data buffer may be discarded. For example, the data in the data buffer 326 may be discarded due to a PDCP discard timer or due to another internal process.

At 730, after the UE 120 triggers the SR and prior to transmission of the SR via the communication link, the UE 120 may determine that the data buffer is empty. In some implementations, the UE 120 may determine that a second amount of data in the data buffer is less than a threshold. In some implementations, the threshold may be zero bytes of data. In some implementations, the threshold may be a threshold byte of data. For example, after all or most of the data in the data buffer is discarded (such as due to the PDCP discard timer), the data buffer may be empty.

At 740, after the UE 120 triggers the SR and prior to transmission of the SR via the communication link, the UE 120 may determine to cancel the SR transmission via the communication link if the buffer is empty. In some implementations, the UE 120 may determine to cancel the SR transmission via the communication link if the second amount of data is less than the threshold. As described in FIG. 3, in some implementations, the UE 120 may wait to cancel the SR until a threshold time period prior to the time instant the SR is scheduled for transmission. As shown in FIG. 7, the UE 120 canceling the SR transmission also may prevent the UE 120 from receiving any unnecessary grants from the BS 110. If the data in the data buffer has not been discarded and if the second amount of data in the data buffer is greater than or equal to the threshold, the UE 120 may proceed with the SR transmission via the communication link (not shown).

Figure 8:
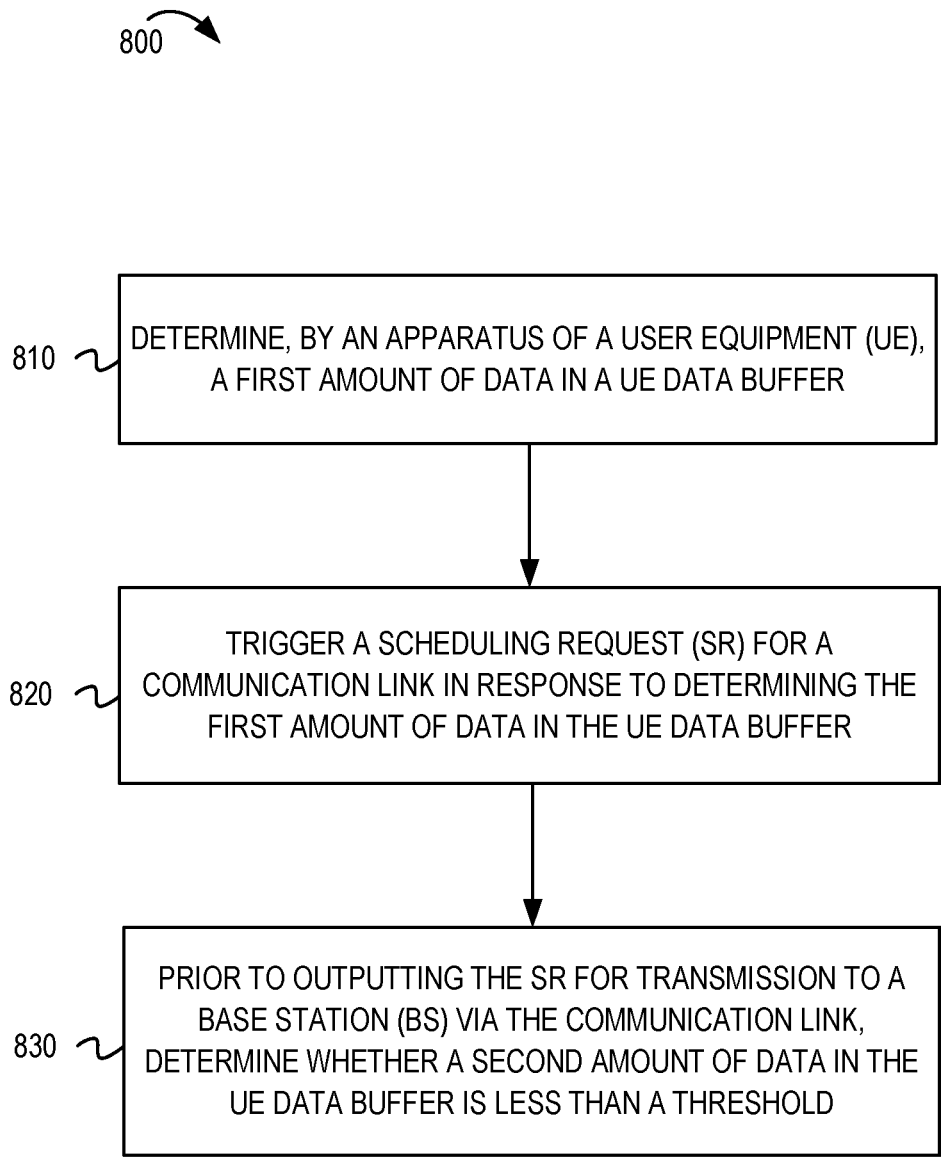
FIG. 8 depicts a flowchart with example operations performed by an apparatus of a UE for optimizing the management of SRs for a DRB that uses a single communication link.

FIG. 8 depicts a flowchart 800 with example operations performed by an apparatus of a UE for optimizing the management of SRs for a DRB that uses a single communication link.

At block 810, the apparatus of the UE may determine a first amount of data in a UE data buffer.

At block 820, the apparatus of the UE may trigger an SR for a communication link in response to determining the first amount of data in the UE data buffer.

At block 830, the apparatus of the UE may, prior to outputting the SR for transmission to a BS via the communication link, determine whether a second amount of data in the UE data buffer is less than a threshold. In some implementations, the apparatus of the UE may cancel the SR at the UE prior to outputting the SR for transmission to the BS via the communication link in response to the second amount of data in the UE data buffer being less than the threshold.

Figure 9:
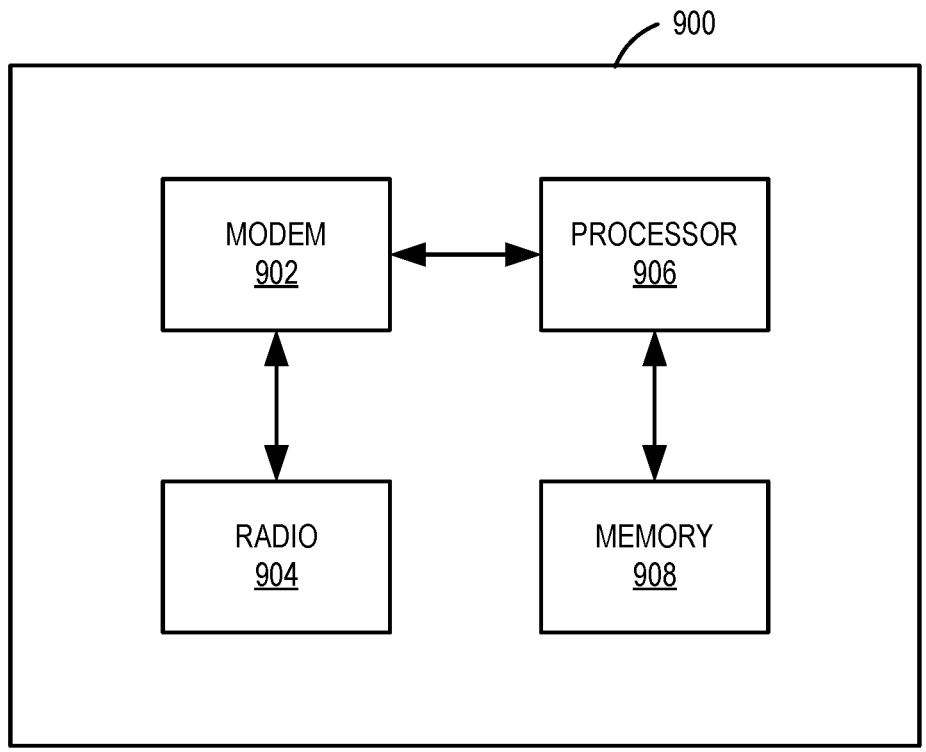
FIG. 9 shows a block diagram of an example wireless communication apparatus.

FIG. 9 shows a block diagram of an example wireless communication apparatus 900. In some implementations, the wireless communication apparatus 900 can be an example of a device for use in a UE, such as the UE 120 described with reference to FIG. 3. In some implementations, the wireless communication apparatus 900 can be an example of a device for use in a BS, such as the BS 110 described with reference to FIG. 3. The wireless communication apparatus 900 is capable of transmitting (or outputting for transmission) and receiving wireless communications.

The wireless communication apparatus 900 can be, or can include, a chip, system on chip (SoC), chipset, package or device. The term "system-on-chip" (SoC) is used herein to refer to a set of interconnected electronic circuits typically, but not exclusively, including one or more processors, a memory, and a communication interface. The SoC may include a variety of different types of processors and processor cores, such as a general purpose processor, a central processing unit (CPU), a digital signal processor (DSP), a graphics processing unit (GPU), an accelerated processing unit (APU), a sub-system processor, an auxiliary processor, a single-core processor, and a multicore processor. The SoC may further include other hardware and hardware combinations, such as a field programmable gate array (FPGA), a configuration and status register (CSR), an application-specific integrated circuit (ASIC), other programmable logic device, discrete gate logic, transistor logic, registers, performance monitoring hardware, watchdog hardware, counters, and time references. SoCs may be integrated circuits (ICs) configured such that the components of the IC reside on the same substrate, such as a single piece of semiconductor material (such as, for example, silicon).

The term "system in a package" (SIP) is used herein to refer to a single module or package that may contain multiple resources, computational units, cores and/or processors on two or more IC chips, substrates, or SoCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SoCs coupled together via high speed communication circuitry and packaged in close proximity, such as on a single motherboard or in a single mobile communication device. The proximity of the SoCs facilitates high speed communications and the sharing of memory and resources.

The term "multicore processor" is used herein to refer to a single IC chip or chip package that contains two or more independent processing cores (for example a CPU core, IP core, GPU core, among other examples) configured to read and execute program instructions. An SoC may include multiple multicore processors, and each processor in an SoC may be referred to as a core. The term "multiprocessor" may be used herein to refer to a system or device that includes two or more processing units configured to read and execute program instructions.

The wireless communication apparatus 900 may include one or more modems 902. In some implementations, the one or more modems 902 (collectively "the modem 902") may include a WWAN modem (for example, a 3GPP 4G LTE or 5G compliant modem). In some implementations, the wireless communication apparatus 900 also includes one or more radios 904 (collectively "the radio 904"). In some implementations, the wireless communication apparatus 900 further includes one or more processors, processing blocks or processing elements 906 (collectively "the processor 906") and one or more memory blocks or elements 908 (collectively "the memory 908").

The modem 902 can include an intelligent hardware block or device such as, for example, an application-specific integrated circuit (ASIC) among other possibilities. The modem 902 is generally configured to implement a PHY layer. For example, the modem 902 is configured to modulate packets and to output the modulated packets to the radio 904 for transmission over the wireless medium. The modem 902 is similarly configured to obtain modulated packets received by the radio 904 and to demodulate the packets to provide demodulated packets. In addition to a modulator and a demodulator, the modem 902 may further include digital signal processing (DSP) circuitry, automatic gain control (AGC), a coder, a decoder, a multiplexer and a demultiplexer. For example, while in a transmission mode, data obtained from the processor 906 is provided to a coder, which encodes the data to provide encoded bits. The encoded bits are mapped to points in a modulation constellation (using a selected MCS) to provide modulated symbols. The modulated symbols may be mapped to a number NSS of spatial streams or a number NSTS of space-time streams. The modulated symbols in the respective spatial or space-time streams may be multiplexed, transformed via an inverse fast Fourier transform (IFFT) block, and subsequently provided to the DSP circuitry for Tx windowing and filtering. The digital signals may be provided to a digital-to-analog converter (DAC). The resultant analog signals may be provided to a frequency upconverter, and ultimately, the radio 904. In implementations involving beamforming, the modulated symbols in the respective spatial streams are precoded via a steering matrix prior to their provision to the IFFT block.

While in a reception mode, digital signals received from the radio 904 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are fed to the demultiplexer for demultiplexing. The demultiplexed bits may be descrambled and provided to the MAC layer (the processor 906) for processing, evaluation, or interpretation.

The radio 904 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication apparatus 900 can include, or be coupled with, multiple transmit antennas (each with a corresponding transmit chain) and multiple receive antennas (each with a corresponding receive chain). The symbols output from the modem 902 are provided to the radio 904, which transmits the symbols via the coupled antennas. Similarly, symbols received via the antennas are obtained by the radio 904, which provides the symbols to the modem 902.

The processor 906 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 906 processes information received through the radio 904 and the modem 902, and processes information to be output through the modem 902 and the radio 904 for transmission through the wireless medium. In some implementations, the processor 906 may generally control the modem 902 to cause the modem to perform various operations described throughout.

The memory 908 can include tangible storage media such as random-access memory (RAM) or read-only memory (ROM), or combinations thereof. The memory 908 also can store non-transitory processor- or computer-executable software (SW) code containing instructions that, when executed by the processor 906, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

In some implementations, the processor 906 and the memory 908 of the wireless communication device 900 may be referred to as a processing system. A processing system may generally refer to a system or series of machines or components that receives inputs and processes the inputs to produce a set of outputs (which may be passed to other systems or components of, for example, one of the UEs 120 or one of the BSs 110). In some implementations, the processing system may include the processor 906, the memory 908, and one or more other components of the wireless communication device 900, such as the modem 902.

In some implementations, the processing system of a UE 120 may interface with other components of the UE 120, and may process information received from other components (such as inputs or signals), output information to other components, etc. For example, a chip or modem of the UE 120 (such as the wireless communication device 900) may include a processing system, a first interface to receive or obtain information, and a second interface to output, transmit or provide information. In some cases, the first interface may refer to an interface between the processing system of the chip or modem and a receiver, such that the UE 120 may receive information or signal inputs, and the information may be passed to the processing system. In some cases, the second interface may refer to an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit or provide information.

In some implementations, the processing system of a BS 110 may interface with other components of the BS 110, and may process information received from other components (such as inputs or signals), output information to other components, etc. For example, a chip or modem of the BS 110 (such as the wireless communication device 900) may include a processing system, a first interface to receive or obtain information, and a second interface to output, transmit or provide information. In some cases, the first interface may refer to an interface between the processing system of the chip or modem and a receiver, such that the BS 110 may receive information or signal inputs, and the information may be passed to the processing system. In some cases, the second interface may refer to an interface between the processing system of the chip or modem and a transmitter, such that the BS 110 may transmit information output from the chip or modem. A person having ordinary skill in the art will readily recognize that the second interface also may obtain or receive information or signal inputs, and the first interface also may output, transmit or provide information.

Figure 10:
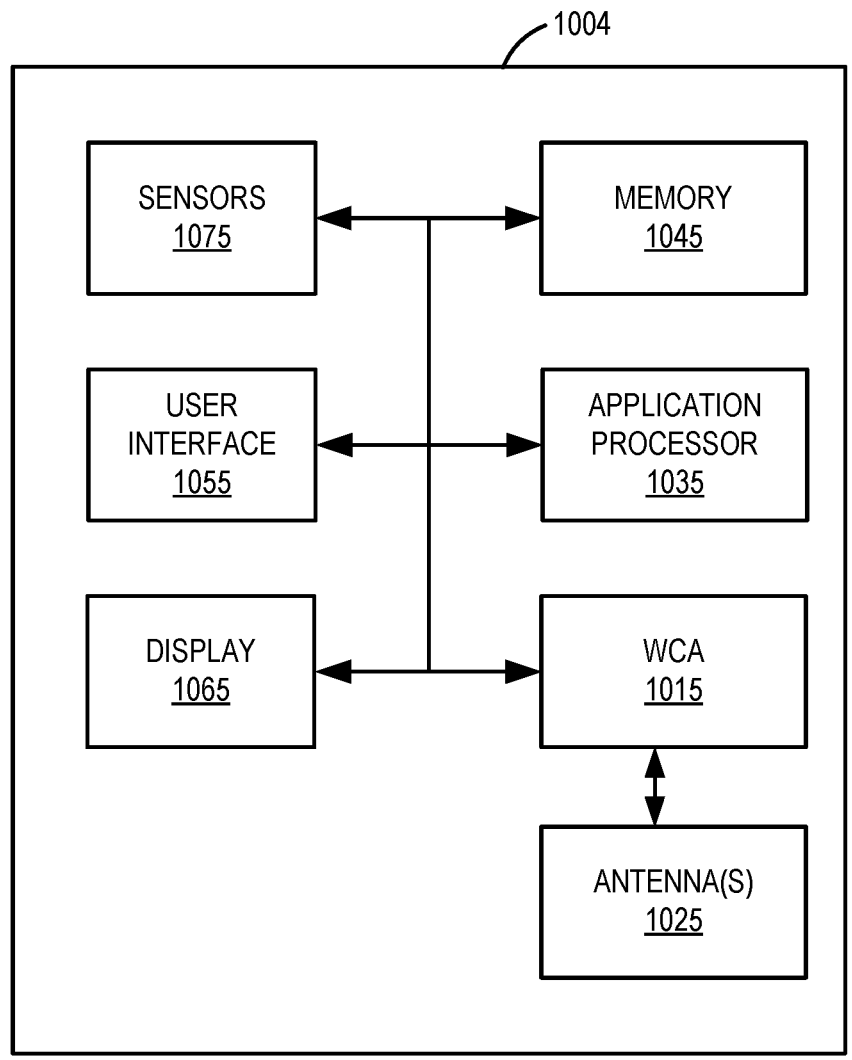
FIG. 10 shows a block diagram of an example mobile communication device.

FIG. 10 shows a block diagram of an example mobile communication device 1004. For example, the mobile communication device 1004 can be an example implementation of the UE 120 described herein. The mobile communication device 1004 includes a wireless communication apparatus (WCA) 1015. For example, the WCA 1015 may be an example implementation of the wireless communication apparatus 900 described with reference to FIG. 9. The mobile communication device 1004 also includes one or more antennas 1025 coupled with the WCA 1015 to transmit and receive wireless communications. The mobile communication device 1004 additionally includes an application processor 1035 coupled with the WCA 1015, and a memory 1045 coupled with the application processor 1035. In some implementations, the mobile communication device 1004 further includes a UI 1055 (such as a touchscreen or keypad) and a display 1065, which may be integrated with the UI 1055 to form a touchscreen display. In some implementations, the mobile communication device 1004 may further include one or more sensors 1075 such as, for example, one or more inertial sensors, accelerometers, temperature sensors, pressure sensors, or altitude sensors. Ones of the aforementioned components can communicate with other ones of the components directly or indirectly, over at least one bus. The mobile communication device 1004 further includes a housing that encompasses the WCA 1015, the application processor 1035, the memory 1045, and at least portions of the antennas 1025, UI 1055, and display 1065.

FIGS. 1-10 and the operations described herein are examples meant to aid in understanding example implementations and should not be used to limit the potential implementations or limit the scope of the claims. Some implementations may perform additional operations, fewer operations, operations in parallel or in a different order, and some operations differently.

The foregoing disclosure provides illustration and description but is not intended to be exhaustive or to limit the aspects to the precise form disclosed. Modifications and variations may be made in light of the above disclosure or may be acquired from practice of the aspects. While the aspects of the disclosure have been described in terms of various examples, any combination of aspects from any of the examples is also within the scope of the disclosure. The examples in this disclosure are provided for pedagogical purposes. Alternatively, or in addition to the other examples described herein, examples include any combination of the following implementation options.

Clause 1. One innovative aspect of the subject matter described in this disclosure can be implemented in a method for wireless communication performed by an apparatus of a UE. The method may include determining a first amount of data in a UE data buffer, triggering an SR for a communication link in response to determining the first amount of data in the UE data buffer, and prior to outputting the SR for transmission to a BS via the communication link, determining whether a second amount of data in the UE data buffer is less than a threshold.

Clause 2. The method of clause 1, further including, in response to the second amount of data in the UE data buffer being less than the threshold, canceling the SR at the UE prior to outputting the SR for transmission to the BS via the communication link.

Clause 3. The method of any one or more of clauses 1-2, where the method of canceling the SR at the UE prior to outputting the SR for transmission to the BS may include canceling the SR at the UE a threshold time period before the SR is scheduled for transmission to the BS.

Clause 4. The method of any one or more of clauses 1-3, where the method of determining whether the second amount of data in the UE data buffer is less than the threshold may include one of determining whether the second amount of data in the UE data buffer is less than a threshold byte of data, or determining whether the second amount of data in the UE data buffer is equal to zero bytes of data.

Clause 5. The method of any one or more of clauses 1-4, where the method may include determining that the communication link does not have scheduled data retransmissions, control messages, or status feedback messages, and canceling the SR at the UE prior to outputting the SR for transmission to the BS in response to determining that the second amount of data in the UE data buffer is less than the threshold, and determining that the communication link does not have scheduled data retransmissions, control messages, or status feedback messages.

Clause 6. The method of any one or more of clauses 1-5, where the communication link may be a 5G NR communication link or an LTE communication link.

Clause 7. Another innovative aspect of the subject matter described in this disclosure can be implemented in a method for wireless communication performed by an apparatus of a UE that supports a split DRB. The method may include determining that a first amount of data in a UE data buffer is greater than a first threshold, triggering a first SR for a first communication link and a second SR for a second communication link in response to determining that the first amount of data in the UE data buffer is greater than the first threshold, outputting the first SR for transmission to a first BS via the first communication link, and prior to outputting the second SR for transmission via the second communication link, determining whether a second amount of data in the UE data buffer is less than a second threshold.

Clause 8. The method of clause 7, where the method may include, in response to the second amount of data in the UE data buffer being less than the second threshold, canceling the second SR at the UE prior to outputting the second SR for transmission to a second BS via the second communication link.

Clause 9. The method of any one or more of clauses 7-8, where the method of canceling the second SR at the UE prior to outputting the second SR for transmission to the second BS may include canceling the second SR at the UE a threshold time period before the second SR is scheduled for transmission to the second BS.

Clause 10. The method of any one or more of clauses 7-9, where the method of determining that the first amount of data in the UE data buffer is greater than the first threshold may include determining that the first amount of data in the UE data buffer is greater than a split data threshold.

Clause 11. The method of any one or more of clauses 7-10, where the method of determining whether the second amount of data in the UE data buffer is less than the second threshold may include one of determining whether the second amount of data in the UE data buffer is less than a split data threshold, determining whether the second amount of data in the UE data buffer is less than a threshold byte of data, or determining whether the second amount of data in the UE data buffer is equal to zero bytes of data.

Clause 12. The method of any one or more of clauses 7-11, where the first communication link may be a primary communication link and the second communication link may be a secondary communication link. The method may include determining, after the second SR is triggered for the secondary communication link, that the second amount of data in the UE data buffer is less than the second threshold, and canceling the second SR at the UE prior to outputting the second SR for transmission to a second BS via the secondary communication link in response to the second amount of data in the UE data buffer being less than the second threshold.

Clause 13. The method of any one or more of clauses 7-12, where the method may include determining that the secondary communication link does not have scheduled data retransmissions, control messages, or status feedback messages, and canceling the second SR at the UE prior to outputting the second SR for transmission to the second BS in response to determining that the second amount of data in the UE data buffer is less than the second threshold, and determining that the secondary communication link does not have scheduled data retransmissions, control messages, or status feedback messages.

Clause 14. The method of any one or more of clauses 7-13, where the primary communication link may be a 5G NR communication link and the secondary communication link may be an LTE communication link, the primary communication link may be an LTE communication link and the secondary communication link may be a 5G NR communication link, or the primary communication link may be a first 5G NR communication link and the secondary communication link may be a second 5G NR communication link.

Clause 15. The method of any one or more of clauses 7-14, where the method of canceling the second SR may include canceling a first transmission of the second SR or canceling a retransmission of the second SR.

Clause 16. The method of any one or more of clauses 7-15, where the first communication link may be a secondary communication link and the second communication link may be a primary communication link. The method may include determining, after the second SR is triggered for the primary communication link, that the second amount of data in the UE data buffer is less than the second threshold, and canceling the second SR at the UE prior to transmission of the second SR to a second BS via the primary communication link in response to determining that the second amount of data in the UE data buffer is less than the second threshold.

Clause 17. The method of any one or more of clauses 7-16, where the method may include determining that the primary communication link does not have scheduled data retransmissions, control messages, or status feedback messages, and canceling the second SR at the UE prior to transmission of the second SR to the second BS in response to determining that the second amount of data in the UE data buffer is less than the second threshold, and determining that the primary communication link does not have scheduled data retransmissions, control messages, or status feedback messages.

Clause 18. The method of any one or more of clauses 7-17, where the method may include determining, after the second SR is triggered, the second amount of data in the UE data buffer. The method of determining the second amount of data in the UE data buffer may include determining an amount of data in the UE data buffer for the split DRB and across all other DRBs associated with a corresponding RAT.

Clause 19. The method of any one or more of clauses 7-18, where the split DRB may be associated with a first SR configuration, and the method of determining the second amount of data in the UE data buffer may include determining an amount of data in the UE data buffer for the split DRB and across all other DRBs associated with the corresponding RAT and associated with the first SR configuration.

Clause 20. The method of any one or more of clauses 7-19, where the first SR may be scheduled for transmission in a first PUCCH from the UE to the first BS and the second SR may be scheduled for transmission in a second PUCCH from the UE to a second BS.

Clause 21. The method of any one or more of clauses 7-20, where the method may include obtaining one or more grants from the first BS in response to the first SR, and outputting one or more data packet for transmission to the first BS via the first communication link in response to obtaining the one or more grants, the one or more data packet including at least a portion of the first amount of data in the UE data buffer.

Clause 22. Another innovative aspect of the subject matter described in this disclosure can be implemented in an apparatus of a UE for wireless communication. The apparatus may include one or more interfaces and one or more processors. The one or more processors may be configured to determine a first amount of data in a UE data buffer, trigger an SR for a communication link in response to determining the first amount of data in the UE data buffer, and prior to transmission of the SR to a BS via the communication link, determine whether a second amount of data in the UE data buffer is less than a threshold.

Clause 23. The apparatus of clause 22, where the one or more processors may be further configured to cancel the SR at the UE prior to transmission of the SR to the BS via the communication link in response to the second amount of data in the UE data buffer being less than the threshold.

Clause 24. The apparatus of any one or more of clauses 22-23, where the one or more processors may be further configured to cancel the SR at the UE a threshold time period before the SR is scheduled for transmission to the BS.

Clause 25. The apparatus of any one or more of clauses 22-24, where the one or more processors being configured to determine whether the second amount of data in the UE data buffer is less than a threshold may include one of the one or more processors configured to determine whether the second amount of data in the UE data buffer is less than a threshold byte of data, or the one or more processors being configured to determine whether the second amount of data in the UE data buffer is equal to zero bytes of data.

Clause 26. The apparatus of any one or more of clauses 22-25, where the one or more processors are further configured to determine that the communication link does not have scheduled data retransmissions, control messages, or status feedback messages, and cancel the SR at the UE prior to outputting the SR for transmission to the BS in response to a determination that the second amount of data in the UE data buffer is less than the threshold, and a determination that the communication link does not have scheduled data retransmissions, control messages, or status feedback messages.

Clause 27. Another innovative aspect of the subject matter described in this disclosure can be implemented in an apparatus of a UE for wireless communication. The apparatus may include one or more interfaces and one or more processors. The one or more processors may be configured to determine that a first amount of data in a UE data buffer is greater than a first threshold, and trigger a first SR for a first communication link and a second SR for a second communication link in response to a determination that the first amount of data in the UE data buffer is greater than the first threshold. The one or more interfaces may be configured to output the first SR for transmission to a first BS via the first communication link. The one or more processors may be configured to, prior to transmission of the second SR via the second communication link, determine whether a second amount of data in the UE data buffer is less than a second threshold.

Clause 28. The apparatus of clause 27, where the one or more processors may be further configured to cancel the second SR at the UE prior to transmission of the second SR to a second BS via the second communication link in response to the second amount of data in the UE data buffer being less than the second threshold.

Clause 29. The apparatus of any one or more of clauses 27-28, where the one or more processors may be further configured to cancel the second SR at the UE a threshold time period before the second SR is scheduled for transmission to the second BS.

Clause 30. The apparatus of any one or more of clauses 27-29, where the one or more processors configured to determine that the first amount of data in the UE data buffer is greater than the first threshold may include the one or more processors configured to determine that the first amount of data in the UE data buffer is greater than a split data threshold.

Clause 31. The apparatus of any one or more of clauses 27-30, where the one or more processors configured to determine whether the second amount of data in the UE data buffer is less than the second threshold may include one of the one or more processors configured to determine whether the second amount of data in the UE data buffer is less than a split data threshold, the one or more processors configured to determine whether the second amount of data in the UE data buffer is less than a threshold byte of data, or the one or more processors configured to determine whether the second amount of data in the UE data buffer is equal to zero bytes of data.

Clause 32. The apparatus of any one or more of clauses 27-31, where the first communication link may be a primary communication link and the second communication link may be a secondary communication link. The one or more processors may be further configured to determine, after the second SR is triggered for the secondary communication link, that the second amount of data in the UE data buffer is less than the second threshold, and cancel the second SR at the UE prior to transmission of the second SR to a second BS via the secondary communication link in response to the second amount of data in the UE data buffer being less than the second threshold.

Clause 33. The apparatus of any one or more of clauses 27-32, where the one or more processors may be further configured to determine that the secondary communication link does not have scheduled data retransmissions, control messages, or status feedback messages, and cancel the second SR at the UE prior to transmission of the second SR to the second BS in response to a determination that the second amount of data in the UE data buffer is less than the second threshold, and a determination that the secondary communication link does not have scheduled data retransmissions, control messages, or status feedback messages.

Clause 34. The apparatus of any one or more of clauses 27-33, where the one or more processors configured to cancel the second SR may include the one or more processors configured to cancel a first transmission of the second SR or canceling a retransmission of the second SR.

Clause 35. The apparatus of any one or more of clauses 27-34, where the first communication link may be a secondary communication link and the second communication link may be a primary communication link. The one or more processors may be further configured to determine, after the second SR is triggered for the primary communication link, that the second amount of data in the UE data buffer is less than the second threshold, and cancel the second SR at the UE prior to transmission of the second SR to a second BS via the primary communication link in response to determining that the second amount of data in the UE data buffer is less than the second threshold.

Clause 36. The apparatus of any one or more of clauses 27-35, where the one or more processors may be further configured to determine that the primary communication link does not have scheduled data retransmissions, control messages, or status feedback messages, and cancel the second SR at the UE prior to transmission of the second SR to the second BS in response to a determination that the second amount of data in the UE data buffer is less than the second threshold, and a determination that the primary communication link does not have scheduled data retransmissions, control messages, or status feedback messages.

Clause 37. The apparatus of any one or more of clauses 27-36, where the one or more processors may be further configured to determine, after the second SR is triggered, the second amount of data in the UE data buffer. The determination of the second amount of data in the UE data buffer may include a determination an amount of data in the UE data buffer for the split DRB and across all other DRBs associated with a corresponding RAT.

Clause 38. The apparatus of any one or more of clauses 27-37, where the one or more processors may be further configured to obtain one or more grants from the first BS in response to the first SR, and output one or more data packet for transmission to the first BS via the first communication link in response to obtainment of the one or more grants, the one or more data packet including at least a portion of the first amount of data in the UE data buffer.

Clause 39. Another innovative aspect of the subject matter described in this disclosure can be implemented in a non-transitory computer-readable medium having stored therein instructions which, when executed by a processor of a UE, cause the UE to determine that a first amount of data in a UE data buffer is greater than a first threshold, trigger a first SR for a first communication link and a second SR for a second communication link in response to a determination that the first amount of data in the UE data buffer is greater than the first threshold, output the first SR for transmission to a first BS via the first communication link, and prior to transmission of the second SR via the second communication link, determine whether a second amount of data in the UE data buffer is less than a second threshold.

Clause 40. Another innovative aspect of the subject matter described in this disclosure can be implemented in an apparatus of a UE for wireless communication. The apparatus may include means for determining that a first amount of data in a UE data buffer is greater than a first threshold, means for triggering a first SR for a first communication link and a second SR for a second communication link in response to a determination that the first amount of data in the UE data buffer is greater than the first threshold, means for outputting the first SR for transmission to a first BS via the first communication link, and means for determining, prior to transmission of the second SR via the second communication link, whether a second amount of data in the UE data buffer is less than a second threshold.

Another aspect of the subject matter described in this disclosure can be implemented as an apparatus having means for implementing any one of the above-mentioned methods or features described herein.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on."

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, or the like.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The hardware and data processing apparatus used to implement the various illustrative components, logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, or any conventional processor, controller, microcontroller, or state machine. A processor also may be implemented as a combination of computing devices, for example, a combination of a DSP and a microprocessor, multiple microprocessors, one or more microprocessors in conjunction with a DSP core, or any other such configuration. In some implementations, particular processes, operations and methods may be performed by circuitry that is specific to a given function.

As described above, in some aspects implementations of the subject matter described in this specification can be implemented as software. For example, various functions of components disclosed herein, or various blocks or steps of a method, operation, process or algorithm disclosed herein can be implemented as one or more modules of one or more computer programs. Such computer programs can include non-transitory processor- or computer-executable instructions encoded on one or more tangible processor- or computer-readable storage media for execution by, or to control the operation of, data processing apparatus including the components of the devices described herein. By way of example, and not limitation, such storage media may include RAM, ROM, EEPROM, CD-ROM or other optical disk storage, magnetic disk storage or other magnetic storage devices, or any other medium that may be used to store program code in the form of instructions or data structures. Combinations of the above should also be included within the scope of storage media.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method for wireless communication performed by an apparatus of a user equipment (UE), comprising:
   determining a first amount of data in a UE data buffer;
   triggering a scheduling request (SR) for a communication link in response to determining the first amount of data in the UE data buffer;
   prior to outputting the SR for transmission to a base station (B S) via the communication link, determining whether a second amount of data in the UE data buffer is less than a threshold;
   determining that the communication link does not have scheduled data retransmissions, control messages, or status feedback messages; and
   cancelling the SR at the UE prior to outputting the SR for transmission to the BS in response to:
      determining that the second amount of data in the UE data buffer is less than the threshold, and
      determining that the communication link does not have scheduled data retransmissions, control messages, or status feedback messages.

2. The method of claim 1, wherein cancelling the SR at the UE prior to outputting the SR for transmission to the BS includes:
   cancelling the SR at the UE a threshold time period before the SR is scheduled for transmission to the BS.

3. The method of claim 1, wherein determining whether the second amount of data in the UE data buffer is less than the threshold includes one of:
   determining whether the second amount of data in the UE data buffer is less than a threshold byte of data, or
   determining whether the second amount of data in the UE data buffer is equal to zero bytes of data.

4. The method of claim 1, wherein:
   the communication link is a 5G New Radio (NR) communication link or a Long-Term Evolution (LTE) communication link.

5. A method for wireless communication performed by an apparatus of a user equipment (UE) that supports a split data radio bearer (DRB), comprising:
   determining that a first amount of data in a UE data buffer is greater than a first threshold;
   triggering a first scheduling request (SR) for a first communication link and a second SR for a second communication link in response to determining that the first amount of data in the UE data buffer is greater than the first threshold, wherein the first communication link is a primary communication link and the second communication link is a secondary communication link;
   outputting the first SR for transmission to a first base station (BS) via the first communication link; and
   prior to outputting the second SR for transmission via the second communication link, determining whether a second amount of data in the UE data buffer is less than a second threshold,
   determining, after the second SR is triggered for the secondary communication link, that the second amount of data in the UE data buffer is less than the second threshold; and
   cancelling the second SR at the UE prior to outputting the second SR for transmission to a second BS via the secondary communication link in response to the second amount of data in the UE data buffer being less than the second threshold.

6. The method of claim 5, wherein cancelling the second SR at the UE prior to outputting the second SR for transmission to the second BS includes:
   cancelling the second SR at the UE a threshold time period before the second SR is scheduled for transmission to the second BS.

7. The method of claim 5, wherein determining that the first amount of data in the UE data buffer is greater than the first threshold includes determining that the first amount of data in the UE data buffer is greater than a split data threshold.

8. The method of claim 5, wherein determining whether the second amount of data in the UE data buffer is less than the second threshold includes one of:
   determining whether the second amount of data in the UE data buffer is less than a split data threshold,
   determining whether the second amount of data in the UE data buffer is less than a threshold byte of data, or
   determining whether the second amount of data in the UE data buffer is equal to zero bytes of data.

9. The method of claim 5, further comprising:
   determining that the secondary communication link does not have scheduled data retransmissions, control messages, or status feedback messages; and
   cancelling the second SR at the UE prior to outputting the second SR for transmission to the second B S in response to:
      determining that the second amount of data in the UE data buffer is less than the second threshold, and
      determining that the secondary communication link does not have scheduled data retransmissions, control messages, or status feedback messages.

10. The method of claim 7, wherein:
    the primary communication link is a 5G New Radio (NR) communication link and the secondary communication link is a Long-Term Evolution (LTE) communication link, the primary communication link is an LTE communication link and the secondary communication link is a 5G NR communication link, or the primary communication link is a first 5G NR communication link and the secondary communication link is a second 5G NR communication link.

11. The method of claim 7, wherein cancelling the second SR includes cancelling a first transmission of the second SR or cancelling a retransmission of the second SR.

12. The method of claim 5, further comprising:
determining, after the second SR is triggered, the second amount of data in the UE data buffer,
wherein determining the second amount of data in the UE data buffer includes determining an amount of data in the UE data buffer for the split DRB and across all other DRBs associated with a corresponding radio access technology (RAT).

13. The method of claim 12, wherein:
the split DRB is associated with a first SR configuration, and
determining the second amount of data in the UE data buffer includes determining an amount of data in the UE data buffer for the split DRB and across all other DRBs associated with the corresponding RAT and associated with the first SR configuration.

14. The method of claim 5, further comprising:
obtaining one or more grants from the first BS in response to the first SR; and
outputting one or more data packet for transmission to the first BS via the first communication link in response to obtaining the one or more grants, the one or more data packet including at least a portion of the first amount of data in the UE data buffer.

15. A method for wireless communication performed by an apparatus of a user equipment (UE) that supports a split data radio bearer (DRB), comprising:
determining that a first amount of data in a UE data buffer is greater than a first threshold;
triggering a first scheduling request (SR) for a first communication link and a second SR for a second communication link in response to determining that the first amount of data in the UE data buffer is greater than the first threshold, wherein the first communication link is a secondary communication link and the second communication link is a primary communication link;
outputting the first SR for transmission to a first base station (BS) via the first communication link;
prior to outputting the second SR for transmission via the second communication link, determining whether a second amount of data in the UE data buffer is less than a second threshold;
determining, after the second SR is triggered for the primary communication link, that the second amount of data in the UE data buffer is less than the second threshold; and
cancelling the second SR at the UE prior to transmission of the second SR to a second BS via the primary communication link in response to determining that the second amount of data in the UE data buffer is less than the second threshold.

16. The method of claim 15, further comprising:
determining that the primary communication link does not have scheduled data retransmissions, control messages, or status feedback messages; and
cancelling the second SR at the UE prior to transmission of the second SR to the second BS in response to:
determining that the second amount of data in the UE data buffer is less than the second threshold, and
determining that the primary communication link does not have scheduled data retransmissions, control messages, or status feedback messages.

17. An apparatus of a user equipment (UE) for wireless communication, comprising:
one or more interfaces; and
one or more processors configured to:
determine a first amount of data in a UE data buffer;
trigger a scheduling request (SR) for a communication link in response to determining the first amount of data in the UE data buffer;
prior to transmission of the SR to a base station (BS) via the communication link, determine whether a second amount of data in the UE data buffer is less than a threshold
determine that the communication link does not have scheduled data retransmissions, control messages, or status feedback messages; and
cancel the SR at the UE prior to outputting the SR for transmission to the BS in response to:
a determination that the second amount of data in the UE data buffer is less than the threshold, and
a determination that the communication link does not have scheduled data retransmissions, control messages, or status feedback messages.

18. An apparatus of a user equipment (UE) for wireless communication, comprising:
one or more processors configured to:
determine that a first amount of data in a UE data buffer is greater than a first threshold, and
trigger a first scheduling request (SR) for a first communication link and a second SR for a second communication link in response to a determination that the first amount of data in the UE data buffer is greater than the first threshold, wherein the first communication link is a primary communication link and the second communication link is a secondary communication link;
one or more interfaces configured to:
output the first SR for transmission to a first base station (B S) via the first communication link; and
the one or more processors further configured to:
prior to transmission of the second SR via the second communication link, determine whether a second amount of data in the UE data buffer is less than a second threshold;
determine, after the second SR is triggered for the secondary communication link, that the second amount of data in the UE data buffer is less than the second threshold; and
cancel the second SR at the UE prior to transmission of the second SR to a second BS via the secondary communication link in response to the second amount of data in the UE data buffer being less than the second threshold.

19. The apparatus of claim 18, wherein the one or more processors are further configured to:
cancel the second SR at the UE prior to transmission of the second SR to a second B S via the second communication link in response to the second amount of data in the UE data buffer being less than the second threshold.

20. The apparatus of claim 18, wherein:
the one or more processors configured to determine that the first amount of data in the UE data buffer is greater than the first threshold includes the one or more processors configured to determine that the first amount of data in the UE data buffer is greater than a split data threshold, and the one or more processors configured to determine whether the second amount of data in
the UE data buffer is less than the second threshold includes one of:

the one or more processors configured to determine whether the second amount of data in the UE data buffer is less than the split data threshold, the one or more processors configured to determine whether the second amount of data in the UE data buffer is less than a threshold byte of data, or the one or more processors configured to determine whether the second amount of data in the UE data buffer is equal to zero bytes of data.

21. The apparatus of claim 18, wherein the one or more processors are further configured to:

determine that the secondary communication link does not have scheduled data retransmissions, control messages, or status feedback messages; and cancel the second SR at the UE prior to transmission of the second SR to the second BS in response to:

a determination that the second amount of data in the UE data buffer is less than the second threshold, and a determination that the secondary communication link does not have scheduled data retransmissions, control messages, or status feedback messages.

22. An apparatus of a user equipment (UE) for wireless communication, comprising:

one or more processors configured to:

determine that a first amount of data in a UE data buffer is greater than a first threshold; and trigger a first scheduling request (SR) for a first communication link and a second SR for a second communication link in response to a determination that the first amount of data in the UE data buffer is greater than the first threshold, wherein the first communication link is a secondary communication link and the second communication link is a primary communication link;

one or more interfaces configured to:

output the first SR for transmission to a first base station (BS) via the first communication link; and the one or more processors further configured to:

prior to transmission of the second SR via the second communication link, determine whether a second amount of data in the UE data buffer is less than a second threshold;

determine, after the second SR is triggered for the primary communication link, that the second amount of data in the UE data buffer is less than the second threshold; and cancel the second SR at the UE prior to transmission of the second SR to a second BS via the primary communication link in response to determining that the second amount of data in the UE data buffer is less than the second threshold.

23. The apparatus of claim 22, wherein the one or more processors are further configured to:

determine that the primary communication link does not have scheduled data retransmissions, control messages, or status feedback messages; and cancel the second SR at the UE prior to transmission of the second SR to the second BS in response to:

a determination that the second amount of data in the UE data buffer is less than the second threshold, and a determination that the primary communication link does not have scheduled data retransmissions, control messages, or status feedback messages.

* * * * *